United States Patent [19]
Cowe et al.

[11] Patent Number: 5,825,407
[45] Date of Patent: Oct. 20, 1998

[54] CABLE TELEVISION AUDIO MESSAGING SYSTEMS

[75] Inventors: Alan B. Cowe, Denville, N.J.; Richard F. Clowes, New York, N.Y.

[73] Assignee: Albrit Technologies Ltd., Denville, N.J.

[21] Appl. No.: 607,121

[22] Filed: Feb. 26, 1996

Related U.S. Application Data

[63] Continuation-in-part of Ser. No. 120,476, Sep. 13, 1993, Pat. No. 5,495,283.

[51] Int. Cl.$^6$ ........................................................ H04N 7/16
[52] U.S. Cl. ................................. 348/6; 348/9; 348/485; 455/6.3
[58] Field of Search ............................... 348/9, 6, 8, 10, 348/11, 12, 13, 563, 564, 473, 484, 485; 455/3.1, 4.1, 5.1, 6.1, 6.3, 92, 58.1, 59, 61; 370/485, 486, 487; 381/2, 3, 4; H04N 7/16, 7/173, 7/08

[56] References Cited

U.S. PATENT DOCUMENTS

| | | | |
|---|---|---|---|
| 3,975,583 | 8/1976 | Meadows | 348/9 |
| 4,331,974 | 5/1982 | Cogswell et al. | 348/9 |
| 5,099,319 | 3/1992 | Esch et al. | 348/9 |
| 5,140,419 | 8/1992 | Galumbeck et al. | 348/465 |
| 5,548,323 | 8/1996 | Callahan | 348/9 |

Primary Examiner—Christopher C. Grant
Attorney, Agent, or Firm—Handal & Morofsky

[57] ABSTRACT

A multi-channel audio messaging system for cable television, installed at the headend, enables multiple different input audio messages to be supplied to multiple different channels of a cable television system. Multiple analog audio input message sources are supplied as a multiplexed audio input to a digitizer which outputs digitized audio signals which are switched and decoded, under the control of a microprocessor to provide different audio messages on desired channels.

6 Claims, 15 Drawing Sheets

CABLE TELEVISION AUDIO MESSAGING SYSTEMS

This application is a continuation-in-part of application Ser. No. 08/120,476, filed Sep. 13, 1993, now U.S. Pat. No. 5,495,283.

TECHNICAL BACKGROUND

The present invention relates to cable television messaging systems which have the capability to override or supplement standard programming output to subscribers on one or more selected multiple channels with an audio message or a video message, or both. More particularly, the present invention provides a novel system for disseminating emergency alerting information to the public, enabling cable television systems to participate in what is currently known as the Emergency Broadcast System, in accordance with rules of the Federal Communications Commission (FCC).

BACKGROUND OF THE INVENTION

In 1992 typical cable television systems or program distributors, were operating an average of over thirty channels each and many stations, or rather, systems, fully expect to be operating or supplying hundreds of channels in the near future. Technical developments relating to digital data compression and multiplexing of program channels over optical fiber cables, now being installed, are accompanied by promises of the availability of hundreds of cable television channels in the not too distant future.

A typical cable television system comprises a program management and administrative center and what is known as a headend where the image signal distribution equipment is installed. At the headend, incoming programs received by various means such as satellite transmission and antenna pickup, or generated locally and supplied from tape or over hard wire from a studio, are coordinated and distributed out to subscribers over individual program channels. Individual channels typically comprise a channel modulator adapting the audio and video signals to the appropriate frequency band for that channel. The channel modulators output into a combining network that feeds the signal into a cable distribution system for distribution to subscribers.

Very often, if not usually, the headend operation is remote from the programming and administrative center and is unattended, being operated electronically without the presence of a human operator. The automated operation of the cable television headend, and other technical considerations, raise difficulties in providing occasional or periodic override messaging of the output programming signals on a given channel. The difficulties are compounded if selective channel messaging, rather than blanket messaging of all channels, is desired. A particularly important override message is an emergency alerting signal in audio or video form. Under current regulations, a television, or radio broadcast station, as a condition for an FCC license must have a human operator on duty, and responsible for processing emergency alerts, whenever the station is on the air. This operator responds to various types of emergency alerting inputs and actuates the station emergency messaging in accordance with the operator's judgment, having regard to established emergency agency rules and station policy.

A customary alert signal, indeed the standard national Emergency Broadcast System tone is a two-tone signal which is transmitted on a weekly basis, as a test signal, with a standardized message alerting the public to the fact that a test of the Emergency Broadcast System is taking place. This test signal is familiar to most people in the USA. In the event of a national emergency, for which the system has, at this writing, never yet been activated, it can reasonably be expected that all people tuned to a broadcast television or radio signal will be reached with an audio message describing the emergency. With the growth of cable television and cable television programming, large sectors of the population are viewing non-broadcast channels not accessed by the Emergency Broadcast System.

Means do exist for transmitting emergency broadcast signals over the cable television distribution system to viewers. Where the cable television system is relaying a signal from a television station broadcasting radio frequency signals over the airwaves, any emergency signal transmitted by that broadcast station is also relayed to the cable television suibscriber-viewer. However, as noted above, a typical cable television system includes tens of non-broadcast channels, supplied for example by tape, by movies, by local programs created by, or for, special interest groups, and so on. These viewers are not reached by the Emergency Broadcast System, unless the cable television system takes measures to override its non-broadcast programming with emergency alert information or messages. Lackng such alert information, there may be serious delays before these non-broadcast channel viewers become aware of impending natural disasters such as hurricanes, tornadoes and flash floods, or are alerted to threats to their safety from riots, prison escapees and the like, or referring to the fears that gave birth to the Emergency Broadcast System, before they are notified of military threats, including nuclear missile attacks.

Noting especially the proliferation of channels, and noting also the modest size of some cable television systems, (recent data indicate that over 60% of cable television systems have less than 1,000 subscribers) technical difficulties and significant costs arise in providing a cable television message override system. It has been estimated by the Society for Cable Television Engineers (SCTE) that headend upgrades to handle both audio and video Emergency Broadcast System signal delivery, based on the equipment available prior to the present invention, could total nearly half a billion dollars for the USA (see, for example, Cablevision p. 15, Jul. 5, 1993, "Revving Up a Test Drive For EBS").

Means also exist for conveying emergency alerts to viewers of non-broadcast cable television channels but known means are limited in functionality, are not all-encompassing and do not reach all viewers.

It is present policy of the FCC to bring all cable television viewers within the ambit of the Emergency Broadcast System, or of a renamed nationwide emergency alerting system, and guidelines or regulations for achieving this aim are expected to be promulgated shortly. These guidelines include performance parameters for a new "device" or devices for overriding non-broadcast cable television channels with emergency alerts. Relevant FCC activities are proceeding under OF Docket # 91-301 and OF Docket # 91-171. The latest publicly available document from the FCC under this heading, of which applicant is aware, is a "NOTICE OF PROPOSED RULEMAKING/FURTHER NOTICE OF PROPOSED RULEMAKING" released Oct. 8, 1992 ("NPRM/FNPRM").

On Jan. 15, 1993, a document entitled "COMMENTS OF THE SOCIETY OF CABLE TELEVISION ENGINEERS" (SCTE Comments) was filed by counsel for the SCTE, in the aforementioned FCC docketed matters. The SCTE Comments describe existing Emergency Broadcast System technology for cable television and remark upon the FCC's proposals as to possible performance criteria that might be attained by new equipment. The comments are apparently the collective input of those skilled in the art of cable television engineering, being members of the SCTE. This document apparently represents the state of the art of this topic at Jan. 15, 1993.

Programming override equipment for emergency alert messaging, as currently installed in cable television headend facilities, is described in Appendix A of the SCTE COMMENTS, which information is suLmmarized herein by reference to FIGS. 1 and 2 of the accompanying drawings.

FIG. 1 is a schematic depiction of what is known as a "carrier-substitution method" for emergency alert messaging on cable television systems. This carrier-substitution method is widely utilized in currently operating cable television Emergency Broadcast System equipment, according to the SCTE. The alternative method is lnown as "channelized override", and is described with reference to FIG. 2.

Referring to FIG. 1, carrier-substitution systems employ a group of substitution carriers 10 one for each channel, which are referenced 10, to replace the cable television's headend carriers during an emergency notification. Substitution carriers 10 are coupled to receive audio from a telephone answering device 12, and are available on standby as an alternative to a headend system 14, providing normal programming to the cable system through a switch control 16.

In the event of an emergency, an authorized official appointed by the cable television system calls the cable television headend over a standard, DTMF, touch-tone telephone which activates the telephone answering device 12.

Entry of appropriate codes causes the telephone answering device 12 to operate switch control 16 replacing the programming signals from the headend system with the substitution carriers 10 and feeding them out over the cable system to subscriber-viewers. Depending upon the system, the official's voice can be fed across the telephone lines to modulate the substitution carriers. Viewers of every channel hear the official's message as voice-modulated audio is input to the cable system. At the same time, video on every channel is overridden with a black or blank screen. The message terminates with deactivation by the official entering a turn-off code or hanging up the telephone.

In summary, this commonly used carrier substitution system completely replaces the program signal, eliminating all video from the viewer's screen. This is undesirable, unduly dramatic and may cause many viewers to panic, fearing the emergency has already affected their television reception. The audio only option is to feed the official's voice to all channels; which may override more detailed, more accurate or more relevant warnings carried by broadcast channels that are being relayed on the cable television system.

The channelized override system of the prior art shown in FIG. 2 is also activated by a touch-tone telephone to which a telephone answering device 12 responds, activating switch control 16 in response to the proper touch-tone code, whereupon the telephone audio message overrides the program audio on all channels. In this case, in contrast to the simpler carrier-substitution method of FIG. 1, the override audio and an optional override video signal are superposed or overlaid on the program carriers, rather than substituting them. The override signals are supplied to an intermediate frequency modulator 17, passed to a splitting network 18 which raises and splits the signals to the requisite number of frequencies, channels. Each program override signal is switched through a respective cable television modulator-processor 19 where it replaces program signal. The output of each modulator processor is fed through the cable system's combining network 21 for transmission to viewers.

This method is much more costly than the carrier substitution method because the override is effected separately for each channel at channel frequencies which are typically in excess of 50 MHZ whereas the substitution carrier method employs a common RF override.

An advantage of the more expensive channelized override approach is the option of selectively overriding a predetermined number of channels. However, a further drawback of this known channelized override system is that the selection of channels to override is fixed, being made permanently when the channel override hardware is installed, and cannot be automatically or dynamically redetermined.

A further advantage of the channelized approach is the provision of an optional video output as an alternative to a blank screen. This option requires additional equipment for each channel, for example a text-character generator, or live video, if this is available.

In general, the channelized override approach is expensive because program-frequency override signals have to be created separately for each channel, at the headend, means for which are not normally a part of a cable television system's equipment. As reported by the SCTE, cable stations do not generally have a source of live video, although, in some cases, this may be delivered from an activating authority.

Commencing at page 7 of their comments, the SCTE make proposals for design parameters for a new emergency alerting device complying with the proposed FCC requirements, or a close modification thereof. Such a hypothetical device could, according to the SCTE, be a universal device for AM and FM broadcast TV as well as cable television, and should have card slots and optional modules to be able to be tailored for diverse applications and user requirements. Further according to the SCTE, a two-tone emergency warning generator should not be necessary as this tone should be passed through from a broadcast source, and the system should be activatable by a telephone DTMF signal. A capability directly to turn television sets on and off from an incoming cable signal was seen as undesirable.

The hypothetical device would contain intelligence to code addressable information and to act to activate override equipment to pass through emergency information received. The device should be programmable with regard to a rating of the seriousness or impact of a given incoming alert or test, to determine the degree of channel override. This alert level setting by local programming should permit national activation. The device should be capable of receiving emergency information from multiple sources, for example: a CPCS-1 station; NLAA weather radio; state government; local authorities such as the mayor, or city or county emergency management office; or state police, local police or fire departments and the like.

A basic device before options should have connections and associated electronics to receive activation signals and emergency information messages from the local NOAA weather radio frequency, the local AM broadcast CPCS-1 frequency, and via a twisted pair connection. The purpose of the twisted pair input is to enable equipment in cable television headends which is currently accessible to local authorities via telephone connections, to be utilized.

Optional features could include additional inputs from audio and video signals from external sources for example satellite, microwave, or cable links, and AM or FM television broadcast. Optional feature could also include a data port, for example, an RS 232 connection for receiving digitized signals and for those areas having designated local emergency alerting frequencies, the capability of adding an auxiliary RF receiver could also be included.

The hypothetical specification continues with the parameter that once a signal is received, by the device through any one of the aforesaid inputs, the signal is decoded to retrieve address information, implying that incoming signals from all input ports need to be sampled by decoding circuitry. Recommended was the ability to decode two types of signals, namely, standardized digital encoding such as WRSAME coding implemented by NOAA weather radio and DTMF telephone signals to permit utilization of existing equipment.

The hypothetical device is further specified as having necessary electronics and connections to support a contact closure output and an audio output. The contact closure output would be activated in response to an alert signal by the device to activate whatever program override equipment is utilized by the participant. The audio output would serve to pass through emergency information transmitted by an activating entity.

Optional additional outputs include video output for an emergency video signal; a digital output to feed ASCII text for video crawl messaging; an additional data output port, for example an RS 232 and the necessary electronics could be included to provide verification of receipt of an activation signal and of override of programming; a printer or modem, or both.

All these characteristics are no more than desirable goals. No engineering, no circuit design, no principles of design or operation of a device that could comply with these elaborate parameters, are disclosed or suggested by the SCTE.

Noting the proliferation of cable television channels, and that this is a niche market with optimistic potential product runs only in the low thousands, because of the number of cable television systems to be supplied, new override equipment comprehensively meeting all the FCC and SCTE parameters is expected to be extremely costly, so costly as to be prohibitively expensive for smaller cable television facilities, such as those with fewer than a thousand subscribers.

SUMMARY OF THE INVENTION

The present invention solves a problem. It solves the problem of providing an economical cable television messaging system that can override or substitute a video message on a multi-channel cable television system in a selective manner suitable for delivering public emergency alert information to practically any member of the cable television audience.

The above problem is solved by an inventive system which is readily able to receive emergency alerting, or other, messages from multiple sources and to be activated by remote electronic signals, for example, personal computer output or DTMF touch-tone telephone input.

In accordance with the objective of solving one or more of the foregoing problems, the invention provides a cable television video messaging system for selectively overriding a desired input message onto multiple channels of a cable television system having a headend system where multiple external program signals are channelized by means of individual channel modulators having program signal input ports and exported to cable for transmission to a subscriber audience. The inventive video messaging system comprises:

a) a remotely activatable input message decoder to receive, from multiple sources, incoming message information regarding a video message to be overlaid on at least one channel, said message decoder decoding message descriptors embedded in or accompanying said incoming messages;

b) an intelligent message-management device for routing messages to at least one designated channel according to said message descriptors and in accordance with system-based instructions; and c) a video injector to combine said message video with program video for said designated channel to produce a channelized combined video message;

wherein said channelized combined video message is supplied to said channel modulator program input port.

Preferred embodiments employ a digital supervisory and display management system that can be embedded on existing program distribution equipment in a cable television system's headend facility. The invention extends to a headend facility equipped with the inventive video messaging system.

Surprisingly, I have found that, although low cost is an important consideration in making my invention, the expense of digitizing the message input and then separately converting each channelized output to an analog signal output compatible with the program signal, is more than outweighed by the benefits gained. In particular, by employing microprocessors in conjunction with significant data storage capability linked to one another in a data network, the embedding of a digital loop to control an analog processing system brings with it the advantages of digital control. Surprisingly, within the confines of a low-cost, moderate production volume system, I am able to gain the advantages of computer control, along with software programmability of many of the system functions.

A major difficulty in bringing the advantages of inserted video messages to multi-channel cable television systems, lies with the expense of providing separate messaging equipment for each channel. This difficulty is compounded in attempting to bring the benefits of computer management to a cable television headend facility. While the cost of a centralized personal computer used to perform control functions at the headend, which cost will probably be several thousand dollars when allowance for specialized video or audio-video boards is made, may not be unreasonable, the cost of servicing every one of tens of channels with personal computer equipment may be prohibitive.

A further difficulty in providing computer management of cable headend facilities lies in the difficulty of devising suitable interfacing between control systems operating in a digital domain, and tens of continuously supplied video program signals processed in an analog domain, while ensuring that digital control, or supplementation, does not result in unintentional interruption of any program signal. This problem is also solved by the systems of the invention.

These advantages are achievable by employing microprocessor units programmed preferably in an assembly language and wired together, through communications interfaces, or otherwise in communication, so that physically separated units can talk to one another to interchange addressed digital data packets. Thus, in a preferred embodiment, the invention provides a microprocessor-equipped message-management unit with inputs for receiving a variety of coded or decoded message management information. The message-management unit outputs messages, preferably in digital form, labeled with one or more channel addresses according to what channels have been designated to display a given message.

Receiving channels are each equipped with a channel message unit to receive a message addressed for that channel, in digital format, and to overlay or substitute that message, in analog form, on the program video output. Preferably, the channel units each have an audio and a video connection with a modulator unit for that channel. These connections can be with customary jacks, for retrofitting or, alternatively, the channel units could be built in, or incorporated with the modulator units, as original equipment.

Channel message units according to preferred embodiments of the invention are also microprocessor equipped and recognize appropriately addressed messages from the message-management unit. A further problem in messaging multiple cable television channels is that television channels are asynchronous. This means that an overlaid moving text cannot be put out in a common format to every designated channel. Preferred embodiments of the invention solve this problem by providing synchronization means in each channel unit to synchronize a message signal to the channel's horizontal and vertical characteristics.

The message-management unit is preferably adapted to receive the message management information from multiple sources. The message management information can include message content, or location information specifying where the message content is to be found, along with prioritizing or rating information from which the system can, according to predetermined inputs, select a channel or group of channels on which to display the message.

In general terms the CATV messaging system of this invention provides a digital supervisory and message display system embedded on or overlaid on top of the conventional video signal distribution system of a cable television service.

In preferred einbodimeInts, channel units are connected to a message-management server to form a distributed local area network within the cable headend, and are positioned as a unit to receive normal cable television system input and to output to the cable system or headend facility.

While the invention is applicable to the distribution, in a selective manner, of one or more incoming audio messages, among desired cable television channels, without an accompanying video message, preferred embodiments employ the enhancement of video to improve the message's impact, and therefore effectiveness, on the viewer, and to enhance the value of the equipment to the cable television service. Bearing in mind that emergency alerting systems are subject to regular testing, it is important that the message form be acceptable to most viewers, and not unduly annoying.

DETAILED DESCRIPTION OF THE PREFERRED EMBODIMENTS

Some embodiments of the invention will now be described, by way of example with reference to the accompanying drawings, in which similar reference numerals depict similar structural features, and:

Figure 1:
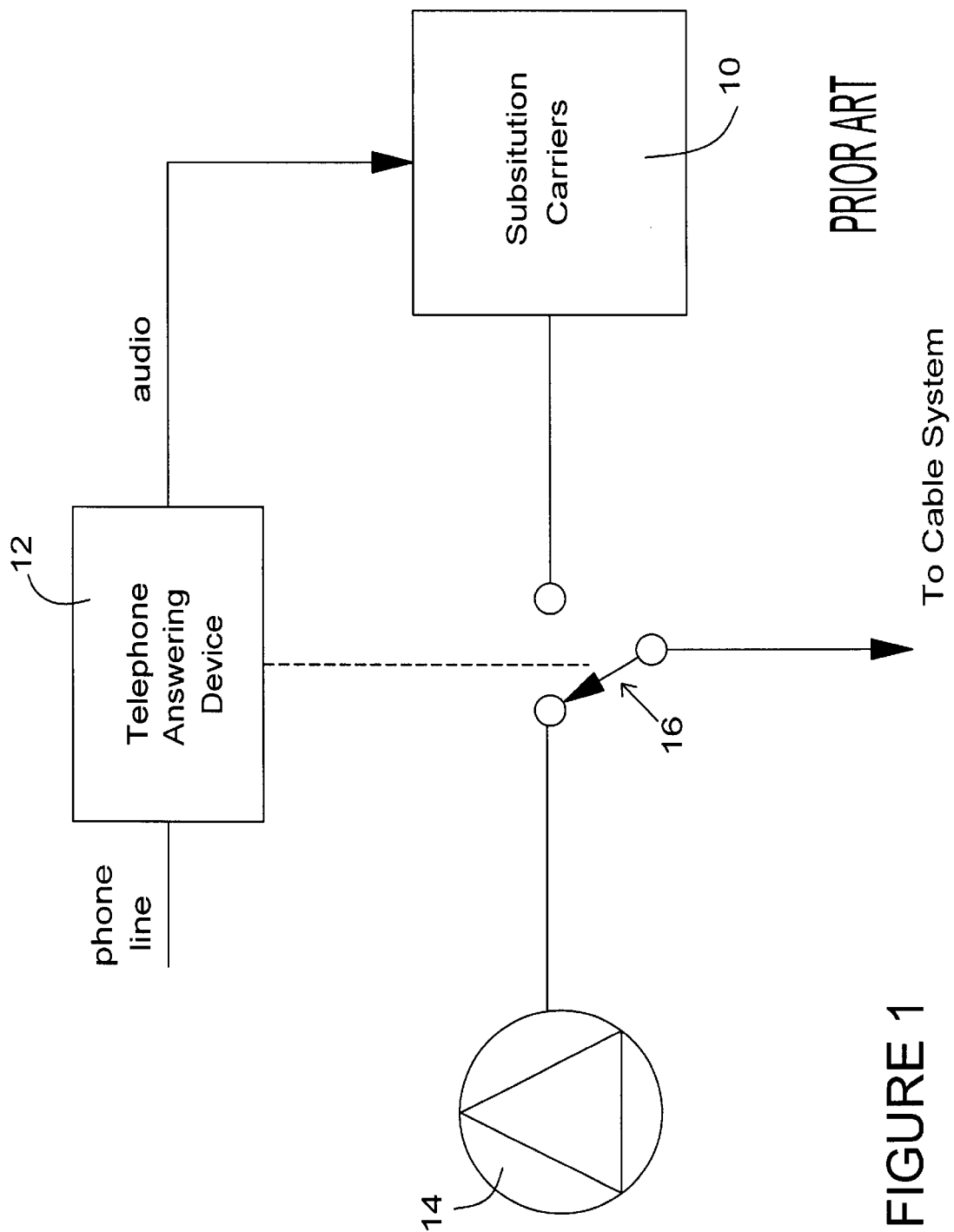
FIG. 1 is a schematic layout of one form of conventional programming override equipment.
Figure 2:
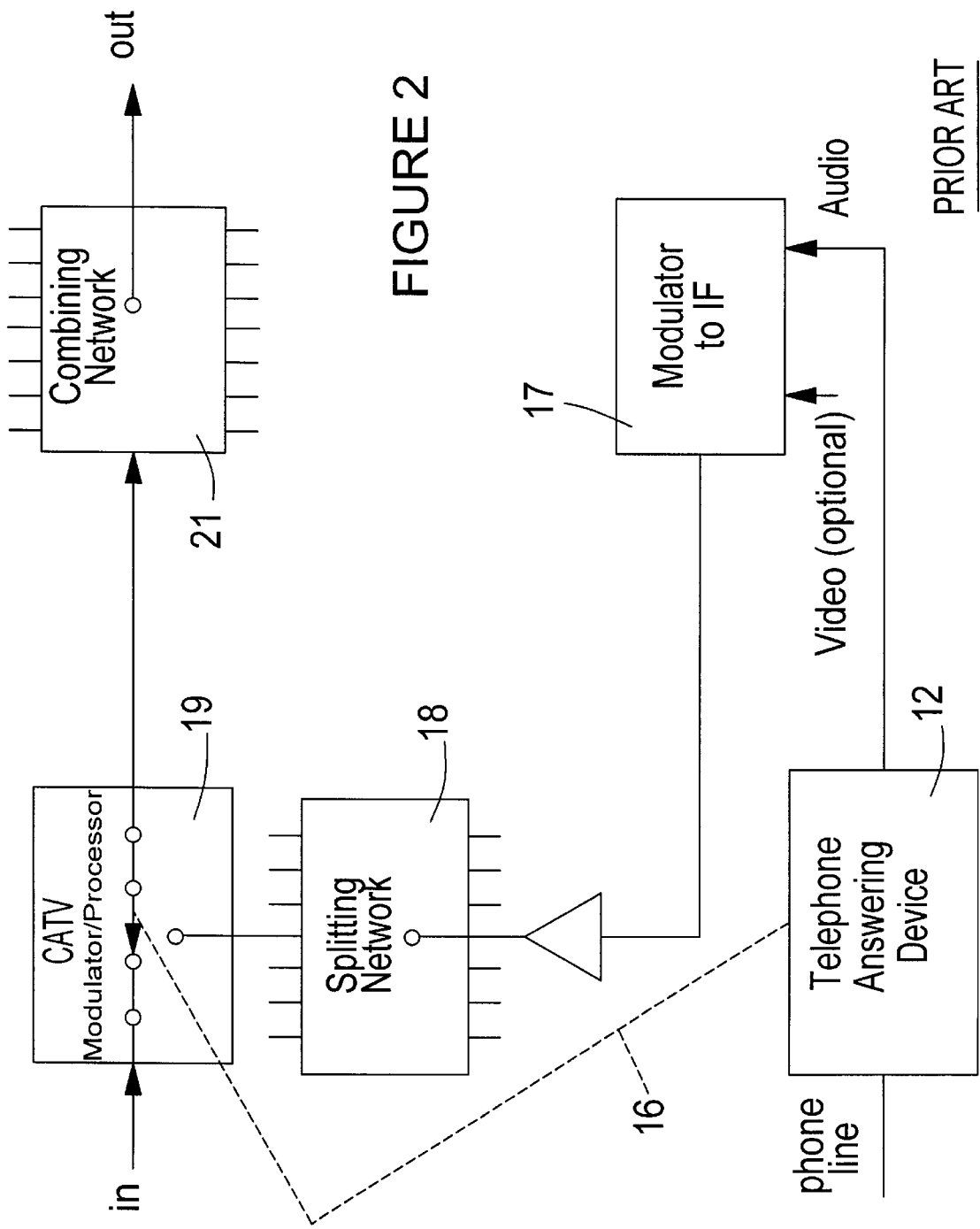
FIG. 2 is a schematic layout of another form of conventional programming override equipment.
Figure 3:
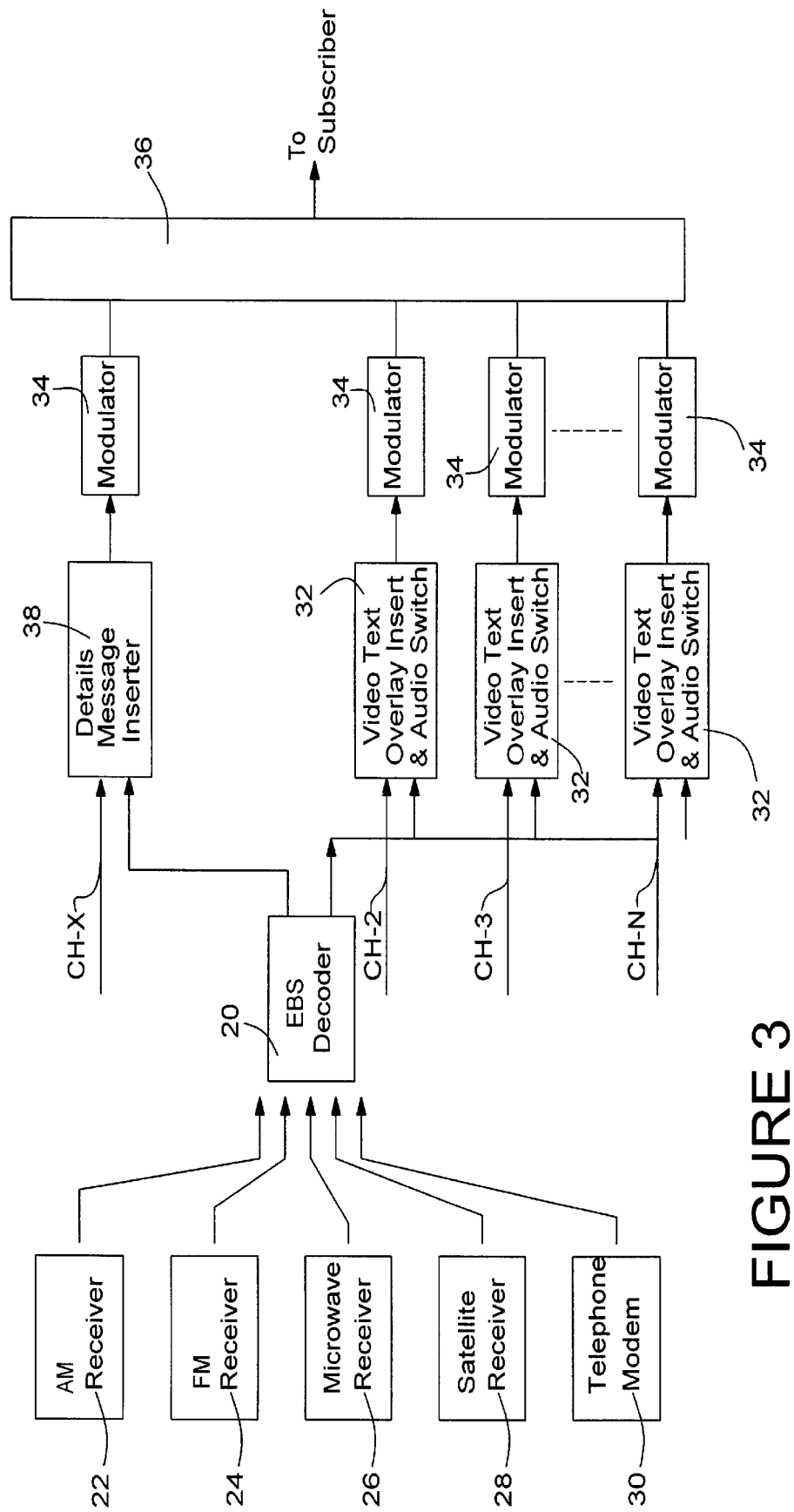
FIG. 3 shows a schematic layout of a cable television system's headend system equipped with a cable television message system according to the invention.

The cable television messaging system shown in FIG. 3 is intended for distributing Emergency Broadcast System alerting bulletins or other messages in audio or video form. Preferred embodiments receive an audio message and output the message as a video text crawl on multiple selected channels. The inventive system decodes incoming messages or message alerts received from a variety of possible sources, determines which channel or channels should receive each message and routes the message accordingly. The inventive system can also generate message video to override, or combine with, base band program video signals.

According to the invention, these steps are carried out prior to modulation of individual channel signals, and a message-bearing combined signal is supplied to each one of a cable television's customary headend system's channel modulators, for the channels designated to receive a particular message.

A feature of the invention lies in intercepting program signals prior to each channel modulator, and selecting the modulator program signal input port as a point of insertion for the supply of a messaged program signal. A preferred embodiment employs individual channel message units for this purpose, and preferably these channel units are controlled by a centralized message-management unit with which the channel message units communicate, which message-management unit supplies addressed message information, including, possibly, message content.

Overall system cost can be controlled by minimizing the functional requirements of the channel units, moving as much functionality as practicable to a centralized message-management unit. For most services with substantial numbers of channels, reducing the cost of the channel units, which are needed one for each channel, will represent a significant saving in delivering a quality video message to selected channels.

Referring to FIG. 3, the inventive cable television messaging system shown comprises a message control decoder 20 which is connected or connectable to receive a variety of communications inputs, for example digital signals embedded within a broadcasted signal received from an AM receiver 22, an FM receiver 24, a microwave receiver 26 and a satellite receiver 28 as well as DTMF control signals and audio overlays via a telephone modem 30. Any of these communications inputs 22–30 can carry an incoming emergency alert signal or other incoming message overlay signal, (which may be a substitution signal completely rather than partially replacing the base program signal) to the message control decoder 20. While at the time of this application, these inputs are usually in analog form, it is expected that emergency alerting messages in particular, may be disseminated in digital format in the future, which digital messages can also be received by the decoder or other components of the present invention.

Message control decoder 20 decodes address and control information associated with an incoming message overlay system and relays the message overlay system to a designated channel or channels through a channel message inserter 32. Channel message inserter 32 also receives channel program information from channel inputs CH-2, CH-3 to CH-N, "N" representing the total number of television channels provided by the cable television system, there being, as shown, one channel message inserter per channel. Each channel message inserter 32 incorporates an audio switch to select between program and message audio and outputs a channel signal to channel modulator 34.

The content of the output channel signal depends upon instructions received from the message control decoder 20 and will comprise normal program information until an override signal is detected by message control decoder 20, whereupon the audio or video signals, or both, that are output to a channel modulator, or modulators 34, for a designated channel or channels, are overlaid or substituted with an incoming, appropriately coded, message, for example, an emergency alert. The output of channel modulators 34 is supplied to a cable system, for distribution to subscribers, through a television combining network 36, in conventional fashion. To comply with FCC requirements intended to incorporate cable television into the national Emergency Broadcast System, or a renamed such system, audio switching to provide a voiced alerting message overriding or replacing program audio, will be necessary, but a video overlay is expected to be optional. However, greater flexibility and product functionality is obtained by providing means for each channel message inserter 32 to insert a video message which can, preferably, be, or include, a text, especially a crawl text moving horizontally.

If desired, a details message can be supplied to a preselected cable information channel CH-X, via a details message inserter 38 activated from message control decoder 20. Other channels can carry messages referring viewers to the details channel in the event of an emergency.

Figure 4:
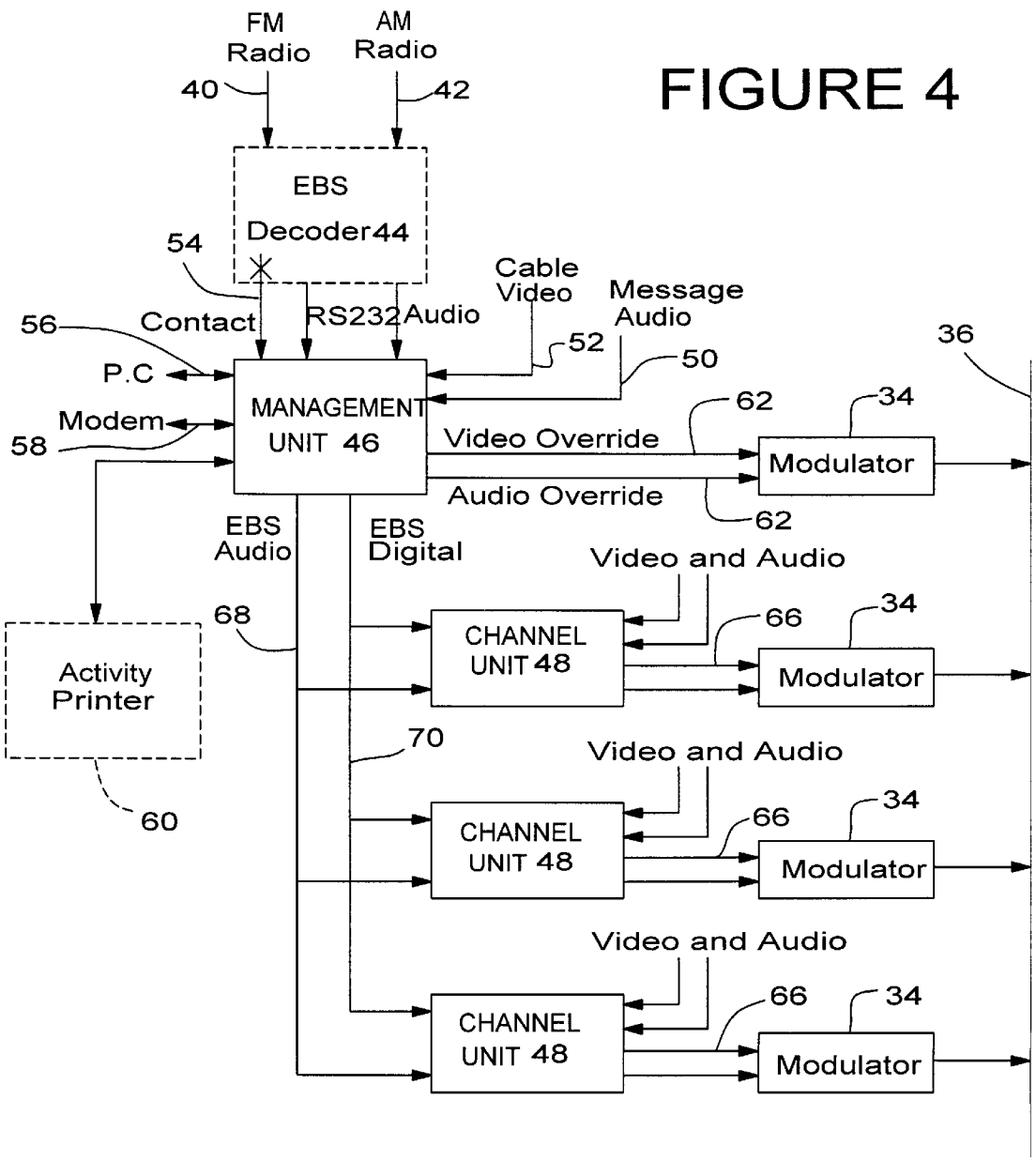
FIG. 4 is a view similar to FIG. 1 of another embodiment of cable television message system according to the invention which is more suitable for larger facilities.

The inventive CATV (cable television) message system embodiment depicted schematically in FIG. 4, installed in a mutlti-channel cable television headend, is suitable for large and medium-sized cable television systems. The novel CATV message system provides the ability selectively to override multiple channels with both audio and video messages, especially for example, with emergency alerting messages. Here, as with the FIG. 3 embodiment, individual channel modulators 34 feed channel signals into a combining network 36. Message signals are received via an AM line 40 and an FM line 42, through a message control decoder 44, which functions as an Emergency Broadcast System decoder and responds to emergency alerts when these are received.

In this embodiment, management of control and message override or insertion is shared between a centralized channel messaging base unit or message-management unit 46, and individual channel message units 48 connected on an open network with message-management unit 46 to receive addressed audio and video information therefrom. Preferably this information is digitized to be susceptible to computer manipulation.

Message control decoders 20 and 44 are intended to operate in accordance with FCC EBS device requirements and can be constructed in any manner as will be apparent to those skilled in the art.

Some possible inputs to message-management unit 46 comprise the decoded output from message control decoder 44 and cable system audio and video message sources 50 and 52 respectively. Thus, for example, the message control decoder may recognize what type of message is coming in, full page, horizontal crawl, foreign language, e.g. Spanish, etc, or perhaps, audio only. Message-management unit 46 then determines what should be done with the decoded message. For example, a Spanish-language message is probably intended only for a Spanish-language channel, and is so-designated by message-management unit 46.

In addition, message control decoder 44 can include a contact switch actuator 54 to activate message-management unit 46, as well as digital input from message control decoder 44, if appropriate, for example over an RS 232 serial interface. A network, or direct, PC interface connection 56 and a modem interface 58 can also be provided, permitting the inventive channel messaging system to be remotely managed under computer control, or to receive instructions, or messages from a near or remote computer. Message-management unit 46 can also output an activity log, message copy or any other available information to a printer 60, if desired.

Message management unit 46 can provide a direct analog audio and video override signal to a details message channel 62, if desired.

Message-management unit 46 uses intelligent digital means, preferably a microprocessor, to manage distribution of incoming messages to the designated channels.

Each channel message unit 48 is also preferably microprocessor-equipped and has audio and video input connections to receive program signals 64, and output audio and video connections 66, to a respective modulator 34. Digital communication with message-management unit 46 can be over an RS 485 link. Channel message units 48 receive appropriately addressed digital messages from message-management unit 46, convert a received message to analog form, combine it with program video, as appropriate, and output the overlaid or substituted signals to their respective modulators.

In an operational example, an emergency alert received by AM radio, in analog form, is decoded, its priority or other coding is read and passed to message-management unit 46 which interprets the priority code, sends an audio message, for example, an emergency official's voiced bulletin, also received over AM radio, to the channels appropriate to that priority. Video messaging is activated, digitized and sent out to the respective channel units where the digitized message is synchronized for that channel and output as analog and overlaid on the program signal, for example, as a horizontal text crawl.

This system permits dynamic scripting on multiple channels. Simpler systems suitable for emergency alerting can provide a single line of text moving across an otherwise uninterrupted program screen. More sophisticated systems can include a graphics processor in both the message-management unit 46 and each channel control unit 48, separately to drive screen sub-divisions or windows and can be used, for example, to provide an onscreen window for passive, or interactive advertising messages from sponsors of programming, or for the cable system or channel to advertise its services or programming, or to sell classified advertising and the like.

The FIG. 5 embodiment, intended for smaller cable systems, is similar to the system described with reference to FIG. 4, except that, here, instead of outputting to individual channel message units, the output from message-management unit 46 is supplied to an intermediate frequency (IF) modulator 68, operating for example at 44 MHZ, which downloads the message audio and video on to all channels for which the IF modulator 68 and CATV messaging system is installed.

Figure 5:
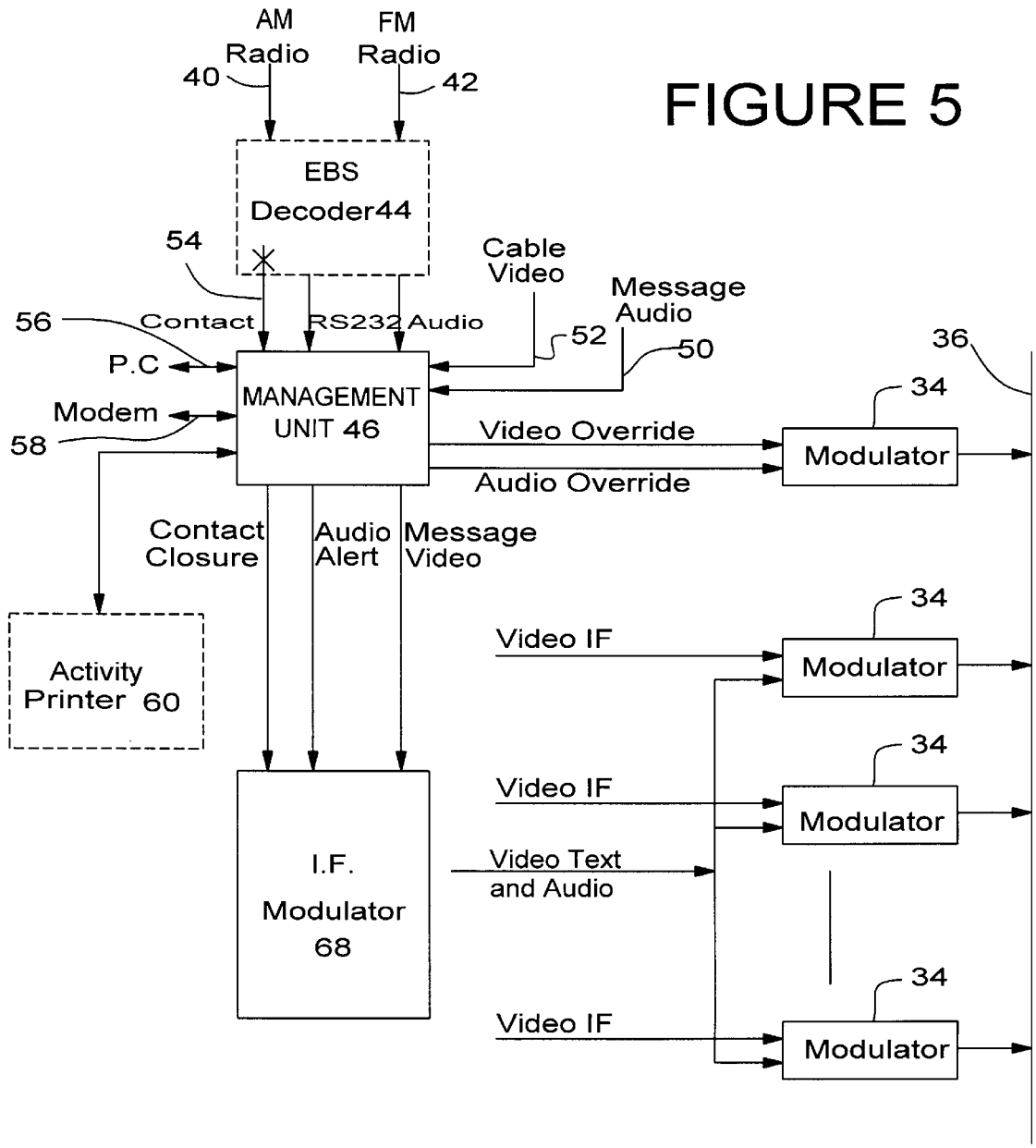
FIG. 5 is a view similar to FIG. 1 of a still further embodiment of cable television message system according to the invention which is more suitable for smaller facilities.

The FIG. 5 system is unable to synchronize message video for individual channels, but provides a blank screen overlay on every channel, or more preferably a static, full-screen text message to accompany the audio message. It thus succeeds in supplying an emergency alert or other message to a group of television channels, being a group selected on installation, including both broadcast and non-broadcast channels, broadcast implying a channel relayed from a broadcasting rf station, via antenna pickup, which station is assumed to be a member of the Emergency Broadcast System.

In one application, the FIG. 5 embodiment breaks into all channels with a static (though possibly pageable) full-screen, preferably textual displayed message accompanied by a voice-over, the same messages being sent to all installed channels. If desired, the text message can tell viewers to turn to a different channel for more information about the emergency.

Figure 6:
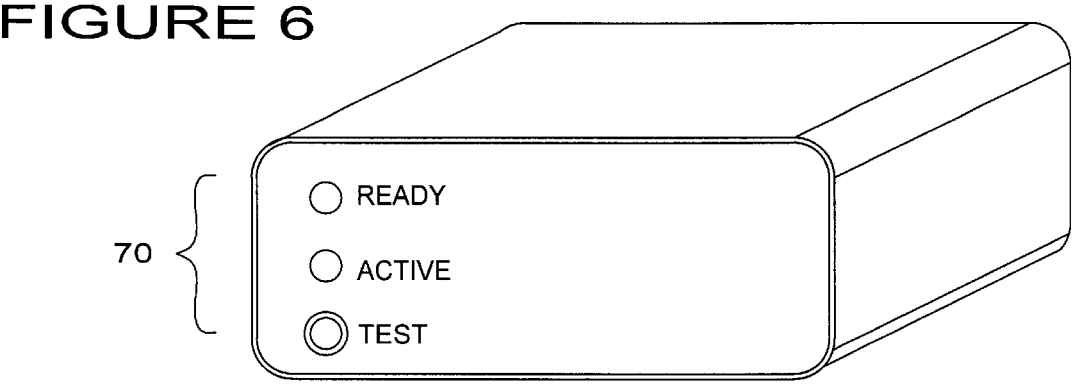
FIG. 6 is a front elevation of a channel message unit depicted schematically in FIG. 4.
Figure 7:
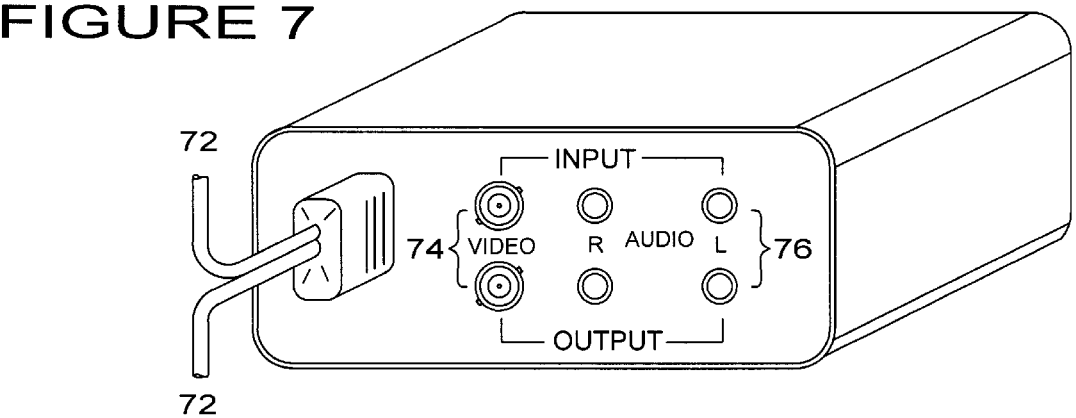
FIG. 7 is a rear elevation of the channel message unit of FIG. 6.
Figure 8:
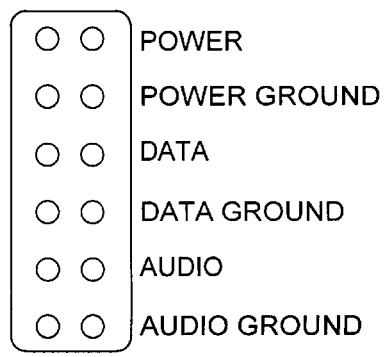
FIG. 8 is a schematic view showing a possible arrangement of communications and power channels between a message-management unit and channel message units.

A suitable channel message unit 48, as shown in FIGS. 6–7, has, for external communication, READY, ACTIVE and TEST indicator lights 70 on its front panel; and on its rear panel a daisy-chained or serial-connected communications cable 72 networking to the message-management unit 46 and other channel message units 48, video input and output 74 and stereo audio input and outputs 76. Power can also be carried in communications cable 72, employing channels such as those shown schematically in FIG. 8.

Figure 9:
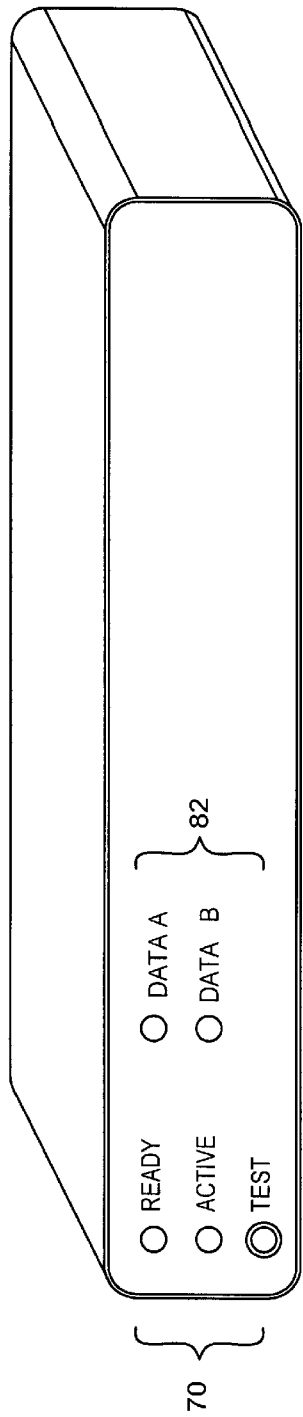
FIG. 9 is a front perspective view of a message-management unit depicted schematically in FIG. 4 or FIG. 5.
Figure 10:
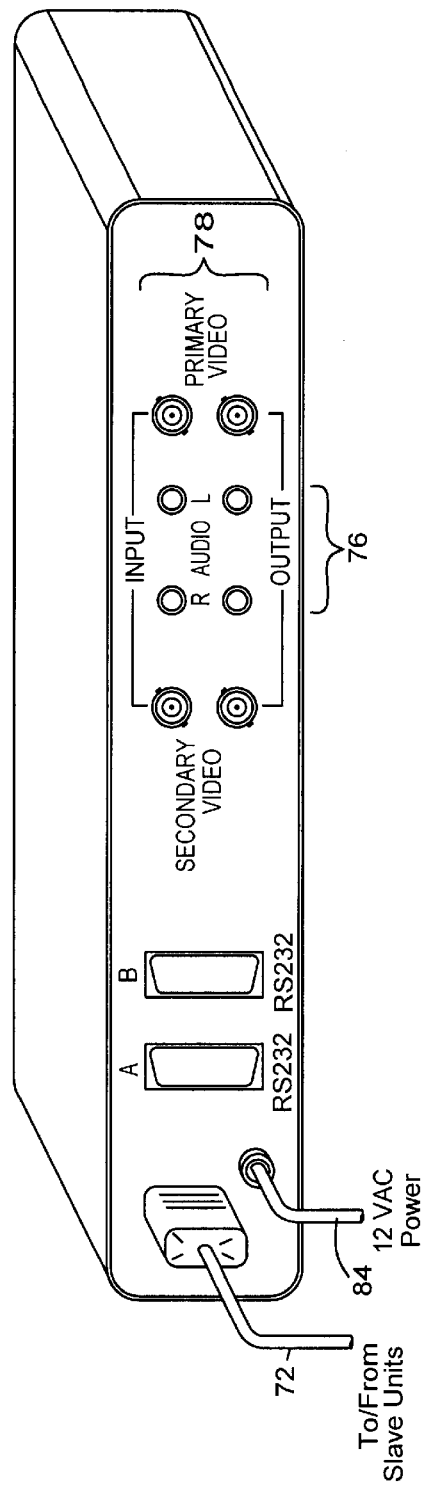
FIG. 10 is a rear perspective view of the message control unit of FIG. 9.

FIGS. 9 and 10 show similar external communications for a message-management unit 46 which has an additional video input/output 78, and two serial data communications ports 80 with data-present indicators 82 and a power cable 84.

Figure 11:
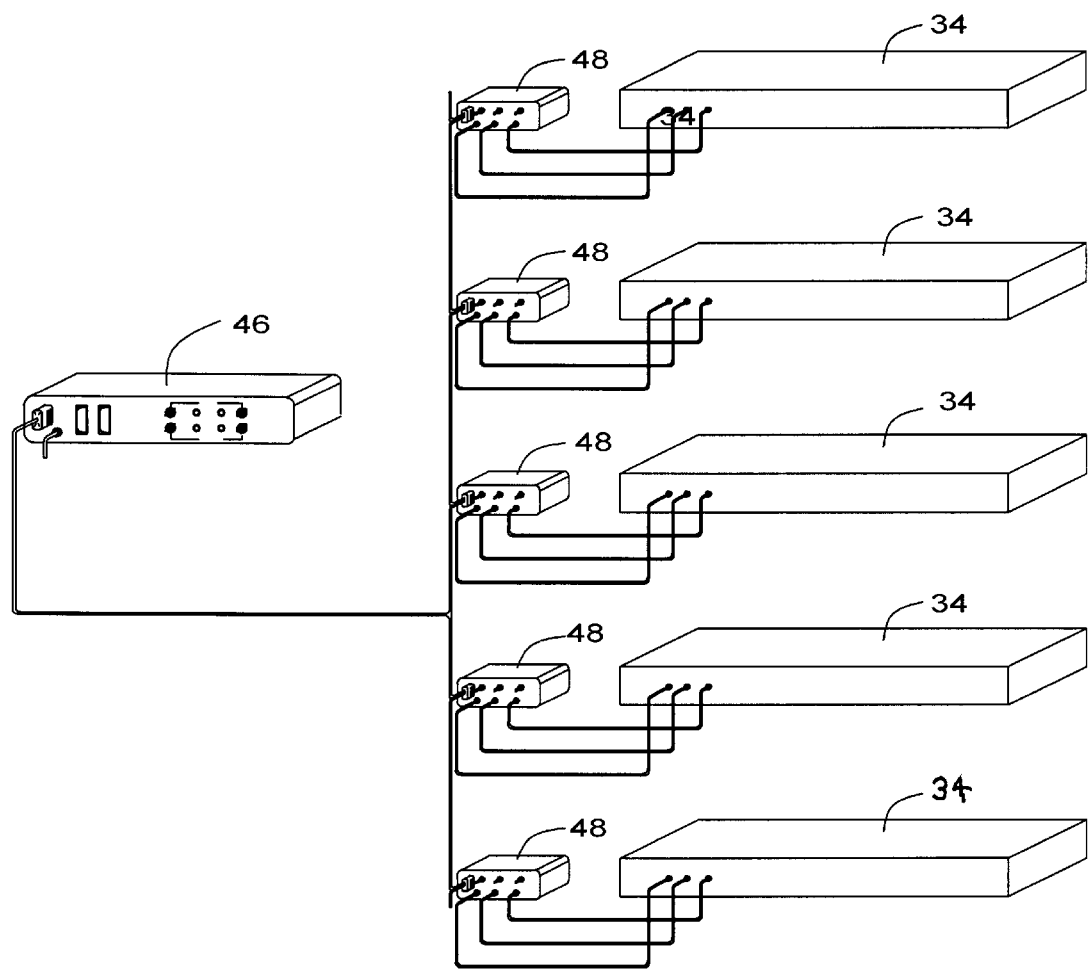
FIG. 11 is a schematic view of one possible physical disposition of the channel message units of the inventive system, at a cable television headend facility.

FIG. 11 shows a message-management unit 46 networked to a plurality of channel message units 48 mounted on racks (not shown) alongside the channel modulators 34, each channel message unit 48 being coupled, or wired to an adjacent modulator 34. Alternatively, the message units 48 could be arranged side-by-side, one with one another, on one or more racks. This may be more convenient when retrofitting the invention by coupling the channel message units 48 to existing channel modulators 34 in a cable television headend system.

Figure 12:
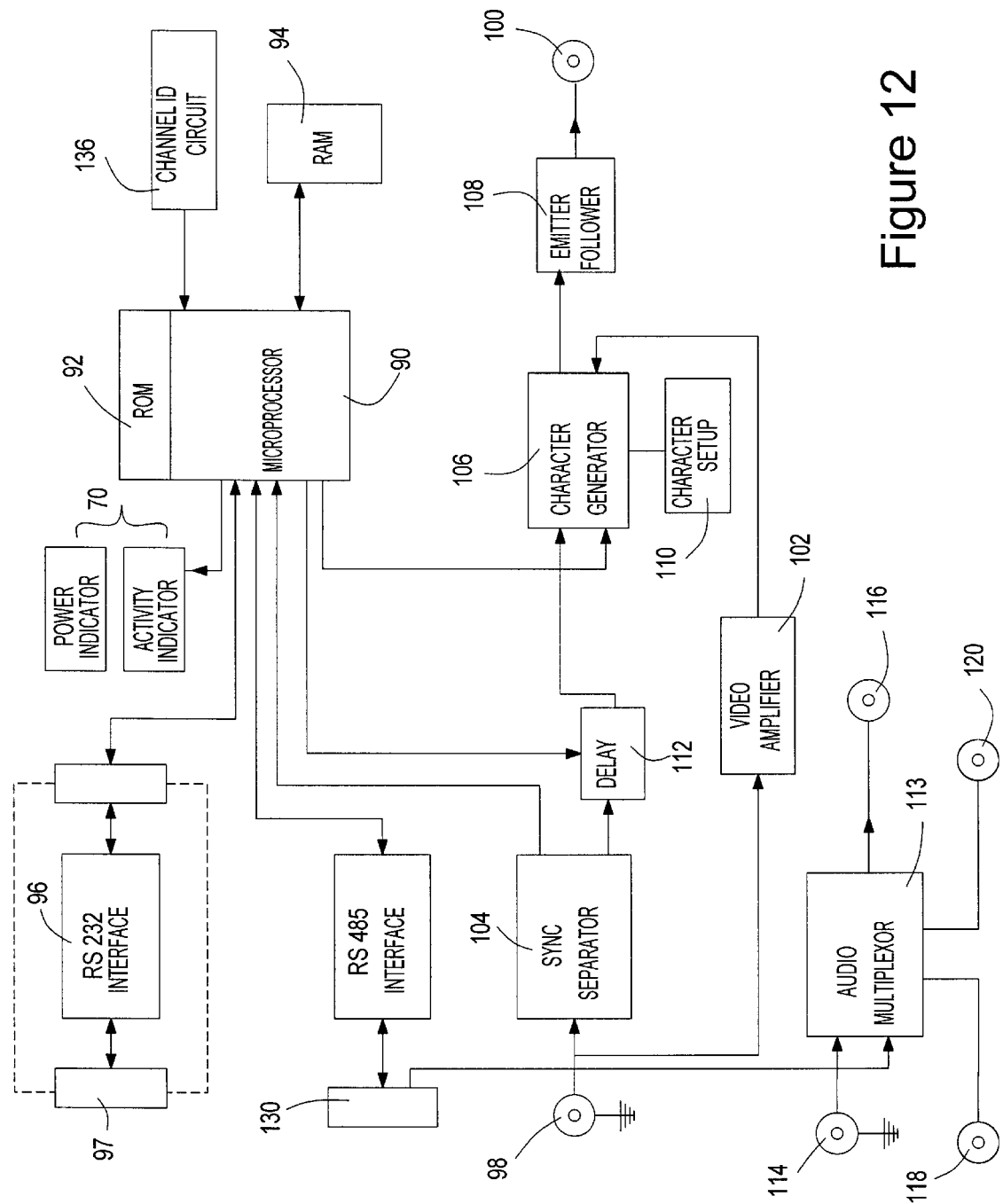
FIG. 12 is schematic block diagram of a programmable, intelligent, audio-video injector unit, which can function either as a message-management unit and as a channel message unit in the preferred embodiments of the invention described with reference to FIGS. 3–11, depending upon how it is programmed.
Figure 13:
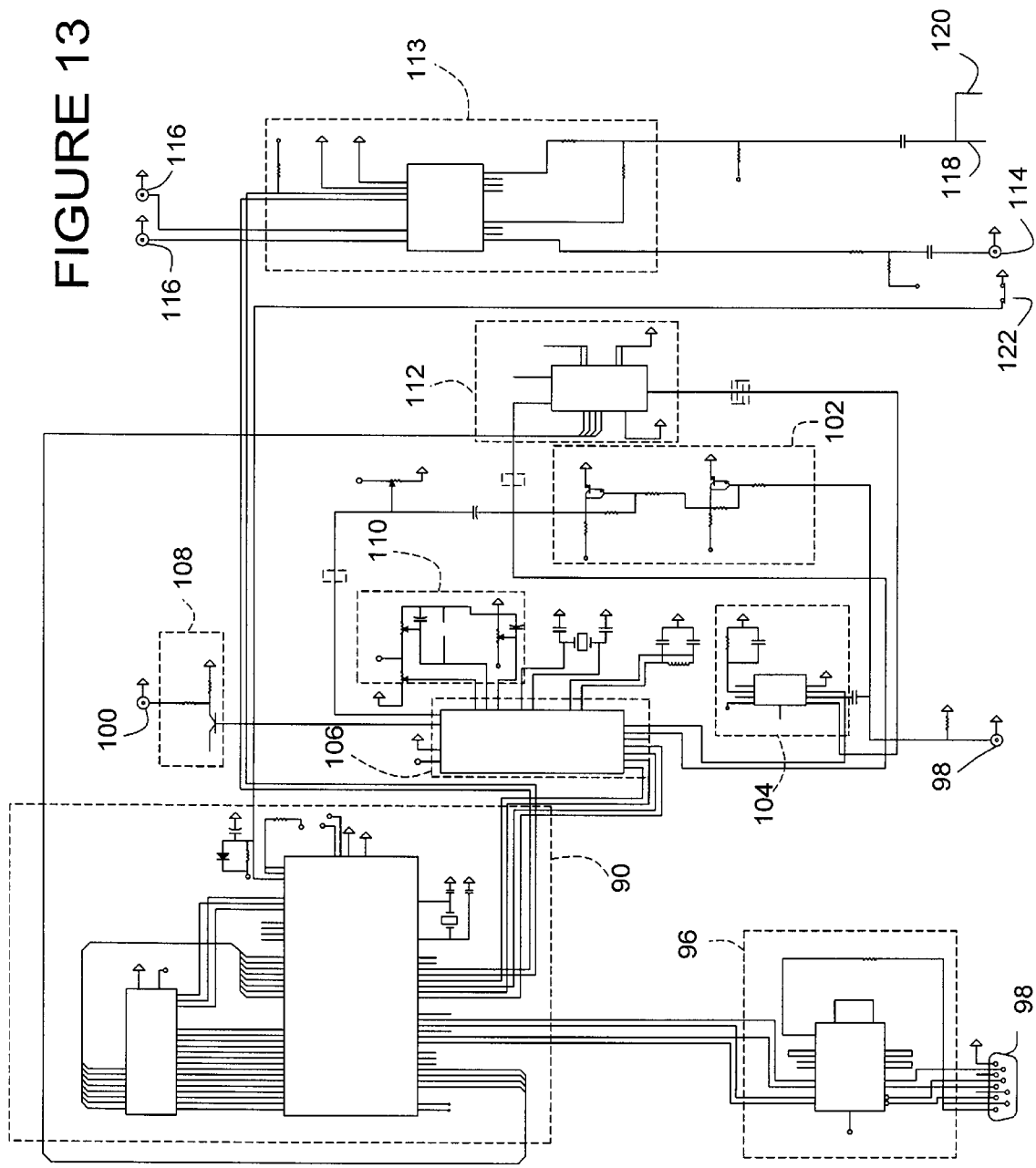
FIG. 13 is a circuit diagram of the intelligent audio-video injector unit of FIG. 12.

The embodiment of FIGS. 12 and 13 exemplifies how a digital control circuit, equipped with a supplemental image source of message video can be embedded in a single unit with a base band video pathway to inject a video message on to the base band video producing a signal for a complex image having independently controllable image sources for split-screen, window and similar effects, and in the particularly preferred embodiment of the invention, for horizontally crawling a text message across an otherwise uninterrupted, continuously running program screen.

One way of programming the intelligent video injector is as a channel message unit 48. In this application, message video received in digital form is converted to a video signal and synchronized, frequency modulated, or otherwise adapted to the requirements of an intended cable television program channel, and output to a channel modulator, or other individual distribution point for that channel.

An alternative application of the intelligent video injector unit, achievable by programming, is as a message-management unit 46. In this case, a video message source or sources, is desynchronized, if necessary, digitized, packaged, processed and addressed according to an externally specified protocol, which can be derived from, or be responsive to a remote incoming signal or instruction, and output on a digital pathway for interpretation by channel message units 48, or, in the case of the IF system of FIG. 5, for interpretation, by the IF modulator 68.

Other useful applications of the novel, intelligent video injector of the invention will be apparent to those skilled in the art. As will also be apparent from the following description, by employing microprocessors, and chip-based functional elements to perform individual video management and conversion roles, and by programming the microprocessors to communicate with one another along cabled data pathways, a compact economical unit, that can be assembled on a single board and supplied in a small box complete with at least one data communications port and video input/output jacks and the like.

Such novel system units readily also manage distribution of an audio message override to software-specified, or control-message specified channels, for example by driving a chip-based audio multiplexer from a central or control microprocessor that also manages the video functions of the intelligent video injector.

Referring to FIGS. 12 and 13, a central microprocessor 90 functions as a control unit and communications center for both the digital and analog system phases, interface to the analog phase being made through one or more digitally derivable video chips for image generation, synchronization and the like.

Central microprocessor 90 is liberally supplied with ROM 92, for program storage and RAM 94, for processing usage. In a practical embodiment for providing a video crawl, 32 Kb is adequate for both purposes. Use of an application-programmed microprocessor avoids the cost and bulk of employing a complete computer system or station at each network node point. Use of an assembler or machine language, which is a preferred practice of the present invention, avoids difficulties arising from limitations of, and equipment capacity requirements of, operating and network systems, but does mean that off-the-shelf software modules cannot generally be employed. An assembler or machine language is highly efficient, imposing modest storage requirements and contributing to the efficiency, compactness and economy of the systems of the invention. A fast, preferably RISC-type, 8-bit commercially available microprocessor, such as supplied, for example, by Toshiba, is suitable for use as control microprocessor 90, for current text crawl applications, while for more sophisticated messaging, a 16-bit or even 32-bit processor may be desirable.

External digital communication to central microprocessor 90 is handled by chip-based communications interface 96, and proceeds physically through a communications port 98, which is conveniently an RS 232 serial port for external communication with the inventive messaging system. For communication, in network style, with other video injector units, port 98 and associated cabling, are preferably RS 485 type.

The common digital componentry provided in multiple video injector units, such for example as a message-nmanagement unit 46 and multiple, perhaps tens of, or even hundreds of, channel message units 48, namely central microprocessor 90, communications interface 96 and vintage port 98, with associated cabling or other remote communication means, coupled with ROM-stored programming enabling multiple microprocessors 90 to "talk" to one another, provides a shared network with distributed processing enabling common functions, such as implement addressing instructions to be centralized, while local functions, such as channel synchronization can be distributed.

A video pathway extends between a video input jack 98 and a video output jack 100, and includes a component-based video amplifier circuit 102, a chip-based synchronizer setup circuit 104, a character generator 106 and an emitter follower 108. A character setup circuit 110 interacts with character generator 106 to control its video output. Character generator 106 and a chip-based delay line 112 which outputs to, or talks to, character generator 106 and synchronizer setup 104, are controlled by, and communicate with central microprocessor 90.

Character generator 106 suffices for the provision of text crawl messages. If a more sophisticated message image is required, character generator 106 can be replaced by a graphics generator or other image generator or suitable video input which can be digitized and then regenerated in channel-compatible form through an appropriately equipped channel unit.

An audio pathway comprises a chip-based audio multiplexer 113, controlled by and communicating with microprocessor 90. Audio multiplexer 113 controls the passage of base band or program audio between audio input jacks 114 and audio output jacks 116. Message audio is received through message input jack 118 and output through message output jack 120. The system provides switching circuitry, including audio multiplexer 113, operating to switch between local audio and external audio sources such as FCC or FEMA supplied warning messages, as instructed by microprocessor 90.

In a message-management or server mode, such as to provide the message-management unit 46, the novel, intelligent video injector can additionally comprise one or more data ports for external communication beyond the network, for programming or message input, and can also comprise, on a common, or additional board, additional input/output devices for receiving messages from multiple sources and for different types of outputs including hard prints, activity reports remote operator alerting and the like.

Programmed and installed as message management unit, the video injector can receive a video message or, instructions for creation of a video message in a number of ways. For example, a video text message could be received through the video input jack 98 desynchronized in the synch setup 104 and digitized through the character generator 106, then input to the central microprocessor 90.

However it is received, central microprocessor 90 coordinates a message or messages with routing information that may be pre-programmed in ROM, separately supplied over a data channel, or coded into the video message. Messages are labeled with desired address information and any local processing instructions and output through the communications link constituted by communications interface 96, communications port 98 and associated cable links, to data-sharing channel message units 48.

In channel message unit mode, as determined by its programming and installation, the video injector receives appropriately addressed messages through its communications link comprising communications port 98 and communications interface 96 into RAM 92 of central microprocessor 90.

Central microprocessor 90 coordinates and controls the insertion of the desired message into base band, program video received through video input jack 98 and the output of the compound signal through video output jack 100. For a horizontal crawl text message, character generator 106 is supplied from RAM 94 with digital message text for conversion to video characters.

The characters are sized and positioned in character setup circuit 110, and synchronized to the intended channel's horizontal and vertical characteristics in synchronizer setup 104. Timing of the message, to flow the characters across the screen is effected by delay line 112 acting on synchronizer setup 104 and character generator 106 under the control of microprocessor 90.

The microprocessor and chip-based systems of the invention have been found to produce excellent quality text crawl messaging. As compared with character generation at a broadcast station picked up and relayed by a cable television service, messaging generated by the herein described systems of the invention gains quality, (or avoids airwave quality losses) from direction injection into the cable distribution system, which is often fiber optic.

Received message audio is routed through multiplexer 113 to specified channels, as designated by central microprocessor 90.

If desired, multiple messages can be synchronized to multiple, different screen regions to create a compositely messaged screen or compositely imaged screen made up of a base band image and a plurality of injected images. As at present envisaged, multiple video injector devices will be needed for each channel, one for each added image segment. However, advances in processing equipment and techniques such as multi-threading, may enable multiple image segments to be processed simultaneously.

A further advantage of the invention is an ability to sense the presence of a carrier signal on any one or more channels. If microprocessor 90 reports that no signal is present, indicating a loss of video on that channel, a suitable default video message can be supplied by the station and automatically inserted by the messaging systems described herein, for example, "Please Stand By. Normal programming will resume as soon as possible."

It may be seen from the foregoing disclosure that, rather than significantly modifying a cable television service's equipment, the inventive messaging systems provide a digital supervisory and display system for the cable television service which system can easily be embedded on top of existing, analog-processing, program distribution systems.

The digitally based control and display systems for cable television facilities provide much more than just a new ability to distribute emergency alert messages, they provide cable television system operators with new means to control and manage their headend facilities. The channel message units can not only insert messages but, with suitable programming, and the addition of diagnostic circuitry, because they read the program signals and have the ability to communicate centrally in digital format, can provide detailed and extensive on-line reporting of channel activities including program signal quality characteristics, signal strength, interruptions, changes and the like, as well as of course as usage of the messaging, which, if paid, can be used for billing sponsors.

Desirable reporting and monitoring functions readily supplied with the inventive system include the status of each channel in a composite display or printout, including a selection of information regarding the presence of video sync, the presence of an operating channel unit 46, assigned channel number for messaging purposes, type and position of message being displayed and status of audio override.

Multi-Channel Audio Overrides

In another embodiment the invention provides a multi-channel audio override capability enabling different audio signals to be piped to different cable program channels, for example, different language versions of a warning message can be overridden on different program channels that customarily carry foreign-language audio. Cable systems in the United States are known to carry, besides English, Spanish, French, Japanese, Chinese and German programming, and doubtless also carry many other languages. The invention provides a multi-channel digital audio module which permits such languages or other audio sources, received from a variety of inputs to be selectively input on desired channels, and which can also provide digital storage and playback of audio messages.

Figure 14:
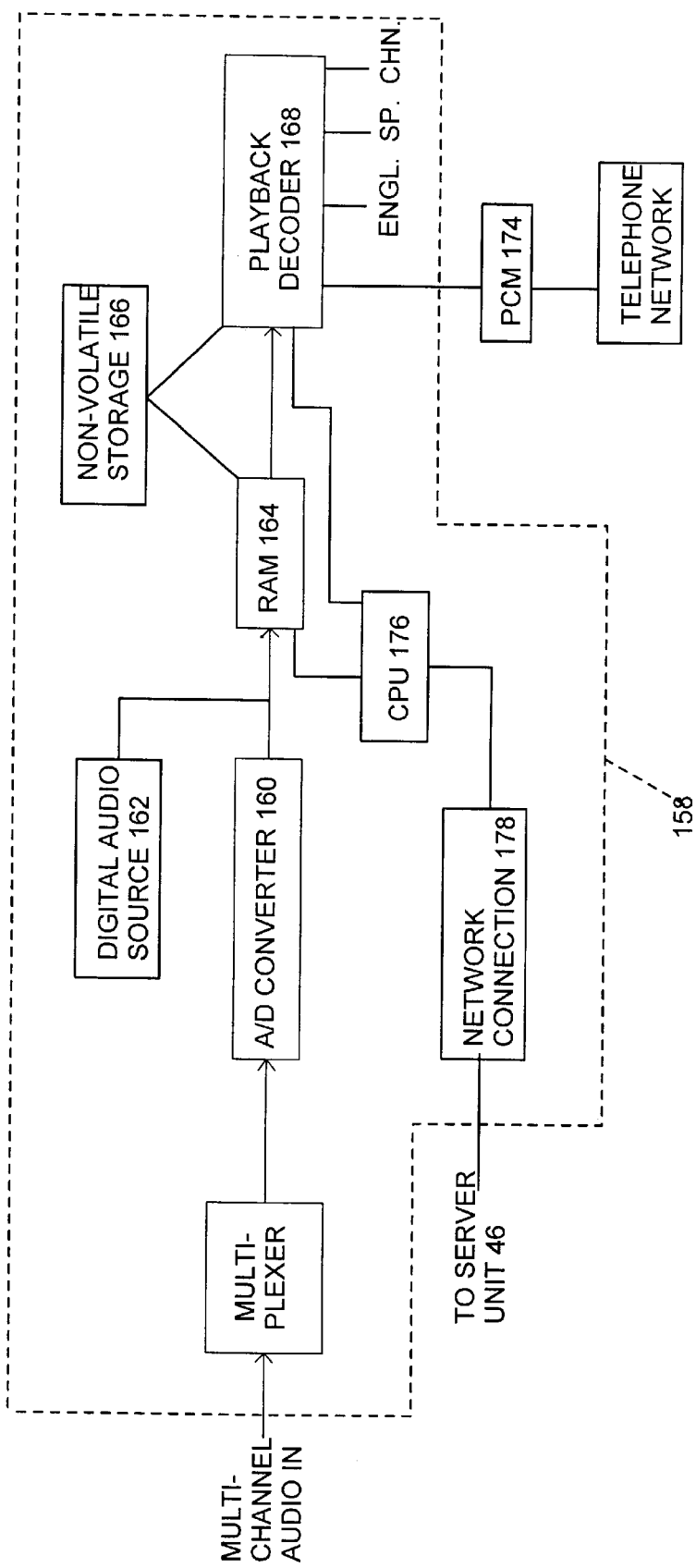
FIG. 14 is a block schematic of a multi-channel digital audio module embodiment of the invention.

As shown in FIG. 14, such a multi-channel storage-and-playback digital audio module 158 can comprise an analog-to-digital converter 160 to which multiple sources of override audio in analog form, from recordings, broadcast, microphone or other such analog source are input. The multiple audio sources are multiplexed to a single input signal using a multiplexer (not shown) either internally or externally of the digital audio module, as desired. Analog-to-digital converter 160 generates a multiplexed, digitized output from the input audio signals. Any desired number of audio inputs and outputs can be accommodated, and the number of inputs need not be, and usually will not be, related to the number of outputs. Although a module 158 can be embodied with only two audio channels, more practical embodiments comprise 8, 16 or 24 available audio channels. 8 channels should provide adequate capacity for most emergency messaging purposes, whereas 16 or even 24 channels will enable larger cable systems to implement a wide range of commercial multi-channel audio applications.

The multiplexed digitized output from converter 160, which can optionally be supplemented with one or more channels from a digital audio source 162, is supplied to RAM 164 whence the signals from individual input channels can be selectively sent, to non-volatile storage 166, e.g. flash memory or offline storage, or to playback decoder 168 which decodes desired signals providing analog audio outputs 170 which are fed selectively to prespecified channels or groups of channels, for example by wired input to a channel message unit 48, where they are available for selective override on the program signal according to control codes received from message-management (or server) unit 46. Optionally, a further audio output 172, comprising one or more multiplexed output audio signals can be supplied as a digital signal to a pulse code modulator (PCM) 174 (which can of course be integrated into digital audio module 158) and output to a telephone or other wide area network for remote transmission, for example, to a message management unit 46 installed at another headend enabling the audio messaging to be passed along to a satellite headend avoiding the need for the satellite headend to receive multiple audio inputs from different sources.

Decoder 168 can retrieve desired messages from storage 166 for later playback under control of a microprocessor CPU176. Microprocessor CPU176 is shown schematically as being coupled to converter 160, RAM 164 and playback decoder 168 but can be coupled to any and all components of digital audio module 158, as appropriate to effect desired control and processing functions. Microprocessor 176 can be networked with a supervisory server unit 46, and channel units 48, or with other desired components or systems, via a network connection 178, e.g. an RS485 interface. Such a remote link enables audio messaging at multiple headends to be coordinated from one headend or a central office, providing channel assignments are properly coordinated.

By interposing digital circuitry between its analog audio inputs 159 and its analog audio outputs 172, digital audio miaodtule 158 enables multi-channel audio messaging to be switched, stored and played back under software control from message management unit 46, or remotely, providing a cable system with a level of sophistication and flexibility in the handling of audio messaging which was not obtainable prior to the present invention.

The depicted configuration is suitable for hard wiring each output to a group of channels. For example, as shown, a Spanish audio otutput is wired to one or more channel units 48 serving one or more Spanish-language channels, a Chinese audio output is wired to a channel unit 48 serving a Chinese-language channel while an English-language audio output is wired to a group of channel units 48 serving the English-language channels which, in the United States, will be the majority of channels in the cable system. If desired, a text-only details channel could be supplied with music appropriate to the event described. Emergency message distribution in foreign languages can be handled in several different ways. The simplest and best way would be to provide a translation on each foreign language channel of a message being broadcast in English on the other channels. Where the English-language message, though received live is in effect a selected one of a number of predetermined messages, the translation could be selected from a digitally stored library of translations of these messages. If desired, or necessary to comply with government regulations, the live warning message in English could be fed to all audio outputs 172, and one or more foreign-language messages could be supplied to appropriate outputs 172 from storage 166, subsequently to the English-language message. Other ways of employing the audio management flexibility provided by digital audio module 158 will occur to those skilled in the art, and in particular, it will be understood that commercial messaging may exploit many different combinations of audio messaging, using live inputs and stored messages to create desired multi-channel outputs.

Digital audio module 158 can be implemented on a single printed circuit board using standard off-the-shelf components, including integrated circuit chips, to provide the described functionality of the various blocks shown. A convenient rack-mountable size for a unit finished with face plate and external interfaces is of the order of 8×5×1.5 inches.

A particular advantage of the configuration of digital audio module shown in FIG. 14 is that it can be implemented to provide advanced audio message management capabilities without requiring any modification of channel units 48. However, a drawback is that physical, hard-wire switching is required to change the output received by an individual channel.

Figure 15:
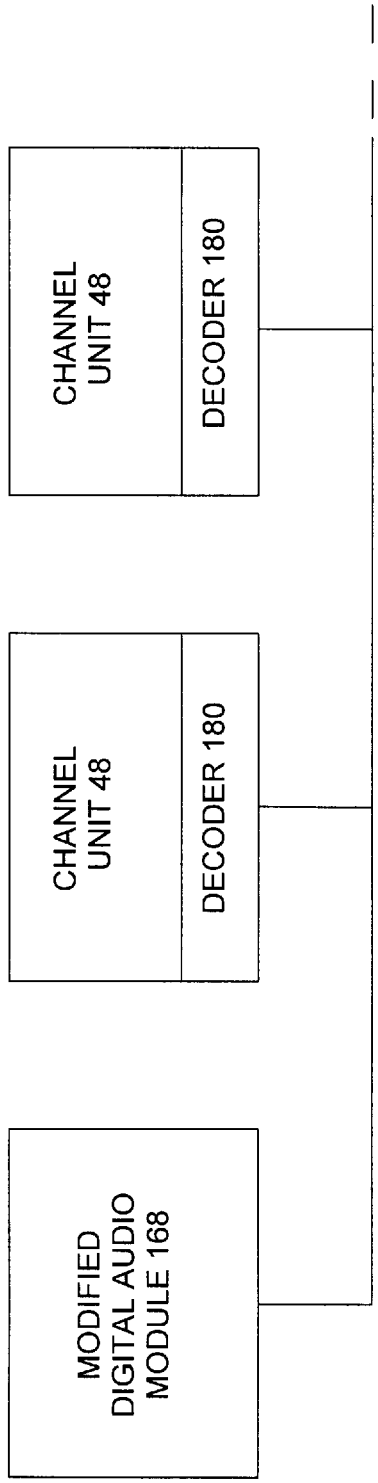
FIG. 15 is a block schematic of a modified digital audio module embodiment of the invention operating in conjunction with modified channel units.

This problem can be solved by implementing decoding at the channel unit 48, as shown in FIG. 15. Here, each channel unit 48 has its own decoder 180 to read and convert digital audio, and the output from a modified digital audio module 158 is supplied as a digital stream, incorporating all desired output audio signals at any given moment, to every decoder-equipped channel unit 48. In this embodiment, CPU 176 causes each audio output to be labeled with a desired channel address, which may be a virtual group address, and each channel unit 48 decodes only the audio feed or feeds carrying its individual channel address. This embodiment provides additional flexibilities, but of course requires additional functionality at the channel unit, which can of course be integrated into the channel unit's printed circuit board. A particular advantage of the FIG. 15 embodiment is that the message audio output fed to any given channel unit 48 can be switched in software, under the control of server unit 46, to accommodate, for example, a channel that switches to foreign language programming late at night.

Telephone Access Module

One important purpose of the described messaging system is to permit live voice-overs, from an ordinary telephone, on any desired number of cable television channels by an authorized emergency official. Whereas such live voice-overs may be input via a telephone answering device upstream of EBS decoder 44, it is sometimes desirable to have a more flexible arrangement whereby the voice over is directly supplied to selected channels (preferably software-specified), via channel units 48, as an auxiliary audio feed that can be switched under control of message-management (or server) unit 46. Such an arrangement is desired by many state and local authorities.

In addition, it would be desirable to provide coordinated access to the messaging system over a single telephone line for voice-overs and computer modem access for uploading text or other visual messaging. Preferably it would be desirable to be able to switch back and forth between computer usage for coded control and messaging and telephone usage for simple keypad actuation and voice overs, without having to disconnect and renew a call. Such a facility is of particular importance for a local emergency officer who may be at a command center during an emergency and wishes to have control of the cable system's messaging capabilities for an extended period, to post bulletins and give voice notifications throughout the duration of the emergency.

Figure 16:
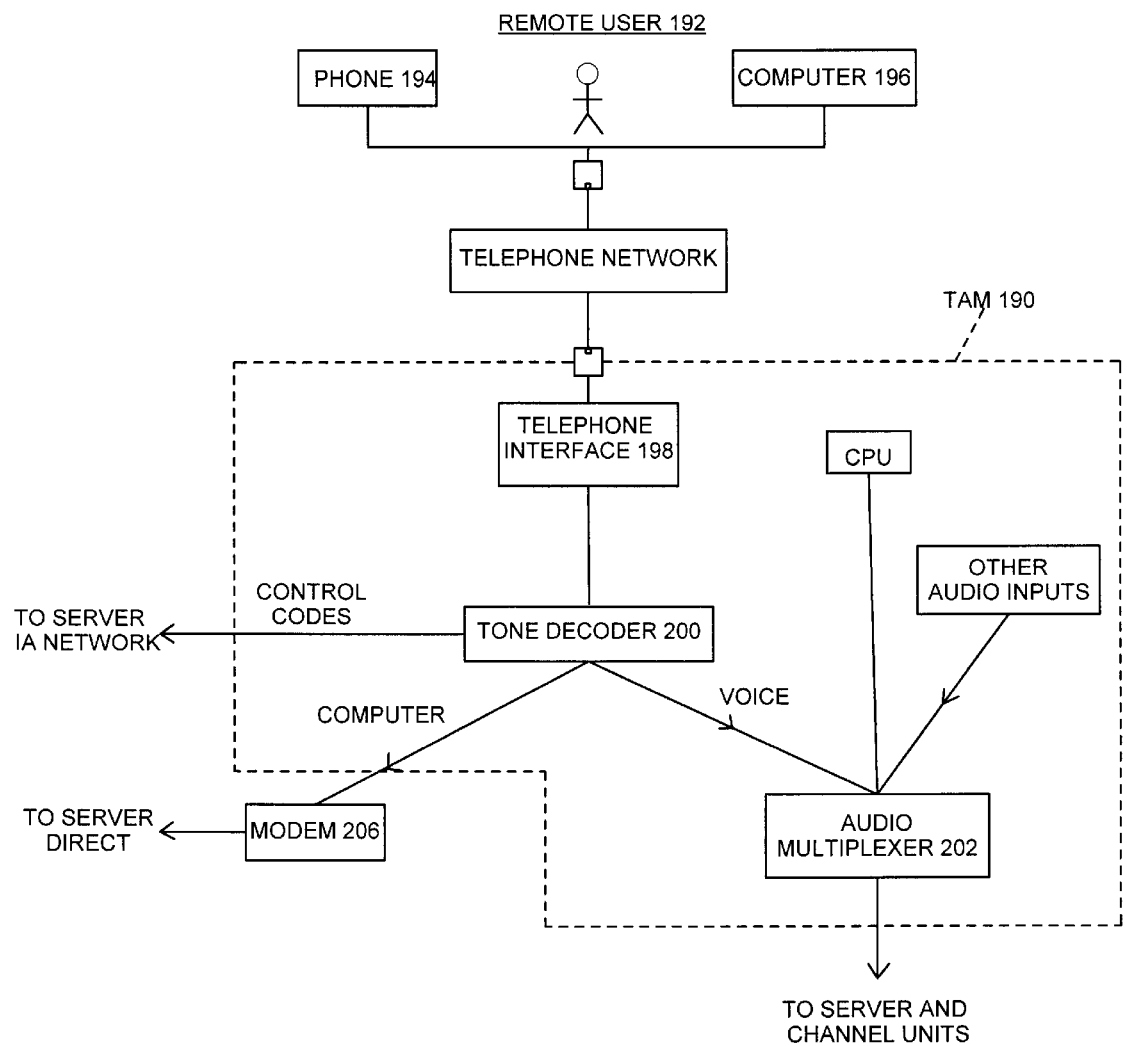
FIG. 16 is a schematic of a telephone access module.

The invention provides a telephone answering module 190, as shown schematically in FIG. 16, which can serve these purposes. A remote user 192 uses a normal keypad, voice handset phone 194 and a modem-equipped computer 196 plugged to a common jack 198 or otherwise commonly connected to a single telephone line. Telephone answering module or TAM 190, is located at the headend and coupled to the headend messaging system, as described above. Conveniently, TAM 190 is incorporated on a common chassis with a communications multiplexer having serial input ports for a local computer, an EBS or EAS decoder, a modem, an output for a printer and any other desired communications interfaces, which communications multiplexer is networked (preferably RS 485) with server unit 46, and shares a microprocessor therewith.

TAM 190 includes a telephone interface 198 to receive and answer incoming calls, a tone decoder 200 to decode and act upon programmed keypad codes and if multiple audio inputs are being handled by the unit, an audio multiplexer 202. CPU 204 may be dedicated or shared with the communications multiplexer (not shown). Modem 206 is typically, though not necessarily a separate, nearby unit. In a typical utilization of the system shown in FIG. 16, remote user 192 initiates a call via phone 194 "dialing" or keying an ordinary telephone number, Telephone interface 198 answers the call and responds with a suitable tone. Preferably, user 192 keys an access code which is accepted or rejected by tone decoder 200. The user now can utilize the system in several different ways by entering codes on the telephone keypad according to selections from a menu. These codes are read by tone decoder 200 and routed accordingly.

Desirable options include voice over, activation of system messages and switch over to computer access. In response to a voice over code, tone decoder 200 opens the telephone audio path via audio multiplexer 202 to server unit 46 and channel units 48 to be carried on whichever channels are selected and activated for message audio pursuant to control codes from server unit 46. Codes activating system messages, prerecorded text messages, with or without recorded audio, are detected by tone decoder 200 and supplied to server 46 via local digital network, as described herein, e.g. via a RS 485 interface. In response to a computer activation code, tone decoder switches the call to modem 206 which then executes a computer handshake with computer 196 enabling direct communication between computer 196 and server 46 using a conventional communications program. Using appropriate system coding, pursuant to this invention, messages written at or uploaded from computer 196 can now be displayed on selected channels of the cable television system. Preferably, keypad codes are available to terminate each of these operations.

On-screen Program Rating System

In another aspect the invention relates to a novel system providing viewer-controllable means of rating, classifying or censoring programs or program segments received over cable. Preferred embodiments include viewer-controlled lockout means permitting viewers to scramble, blackout, mute or otherwise deactivate selected programs, channels or types of programs. Also provided are cable-signal activated means to alert viewers to a forthcoming transmission of, or the on-screen appearance of programming meeting pre-defined classification parameters which may express positive viewer preferences for subject matters such as nature or science programming, children's programming. These are new capabilities for viewers.

Public concern is rising over the content of cable television programming especially programs containing excessive violence or overt sexuality, or scurrilous or anarchistic teachings.

Many viewers would like some means to control, or to be more selective in what they view and in particular there is a great need for means to control children's viewing and prevent unsupervised viewing of programs having contents that their parents or guardians consider to be undesirable.

At present, it is difficult for viewers, or parents of viewers, to have much idea when undesirable programming may appear on screen. Nowadays, major broadcasting networks often provide on-screen, preface-like notifications that a particular program, episode, movie, or the like, contains unusual violence or nudity or may be unsuitable for younger viewers and offer qualifications such as that "Parental discretion is advised". Retransmission of such broadcasting makes up only a small proportion of the programming available on many cable systems. Such prefaces may provide an immediate alert, but do not forewarn.

An alternative source of guidance as to program content is in printed program listings. Current information may be descriptive, for example brief move summaries, vaguely classifying, having for example the ?? caption "Parental Discretion Advised" or content-independent,, for example "(CC)" for close captioned and "(V)" for available on video cassette (see, for example, USA Today, Oct. 19, 1993). Movies have of course been rated for years, supposedly with regard to their suitability for children with one or two alpha designations, for example "PG" Parental guidance "PG-13", "R" "X" and so on, and such designations may be available to the viewer, independently of their television receiver, in printed or electronic media. Such ratings are again only vaguely related to program content, merely suggesting the presence of material "unsuitable" for younger viewers because of violent or sexual content or possibly as being too scary.

This information is clearly sparse, inadequate and inconvenient for many viewers. Accordingly there is a significant need for an efficient system to alert viewers or parents or guardians of younger viewers as to undesirable content of programming or programming episodes.

According to the present invention this and other problems are solved by providing a new program rating system wherein relevant programs, their prefaces, listing entries, trailers, or the or the like, are electronically tagged with a content label selectively decodable by viewers.

Preferably the inventive program rating system includes:
tagging one or more programs with a coded rating label related to program subject matter;
transmitting over the cable system a non-interfering code corresponding with each coded label;
relating that code to forthcoming program material, for example by timing the code to coincide with the program and its commencement or to coincide with an anticipated or scheduled transmission time;
decoding the distributed code at a viewing station and initiating a viewer alert or censor routine at that station.

In preferred embodiments, the code has no effect at viewing stations not equipped with a program decoder and accordingly the invention places a controllable system in the hands of viewers equipped with a decoder. The cable system operator is enabled to provide the desired alert and censorship capability to those viewers wanting it, without in any way affecting viewers who are not interested in such alert or censorship capability.

Program decoding is preferably effected by a program label decoder unit at the viewing station which will commonly be in the home, restaurant, meeting room or the like. A program label decoder unit can be retrofitted to existing cable television viewing stations, for example, by being coupled in series between the channel decoder and the television receiver. In OEM embodiments, the program label decoder functionality can be incorporated on a common chassis with the channel decoder or in the television receiver to provide a single unit.

With the delivery of a program context-sensitive code at the viewing station, a range of new capabilities can be provided to viewers and viewing supervisors. One option is electronically to enable the program code simply to blackout or scramble appropriately labeled programming. The options are preferably settable at the viewing station so that such blacking out or scrambling is the practical equivalent of the viewer simply not turning the receiver on, or of not tuning to that particular program. This point answers objections which program suppliers, or advertising sponsors, might raise to cable television systems deploying the inventive system program rating system described herein.

Preferably the program label decoder has multiple settings which include settings for a complete blackout of all programming, for a fuzz or scramble of all programs, a setting for programs coded as violent, another for programs coded for parental discretion or guidance, and so on. One preferred response includes the provision of a textual alerting message describing the program content, which alerting message can appear prior to a particular program, at the immediate commencement thereof, or at intervals throughout the transmission of the program.

To enable parents, or others to regulate the programming viewed by unsupervised children, control of access to the settings is desirable, and control can be achieved through numeric or alphanumeric buttons or pads operating with an access identification code. However, in a particularly preferred embodiment, the decoder program label includes a keyed lockng mechanism whereby a key is used to select an appropriate setting.

The functionality of the program label decoder unit depends upon the form in which the program code is present on the received signal. If the code is embedded in the video signal then a desynchronizer circuit will be required to locate it the coded label.

At the cable television system's headend, the invention provides means to combine an independently generated program rating code with program channel signals. The programming rating information can be provided in any desired manner. Programs may be coded and rated by the cable system or such information may be provided, preferably in electronic form, from an outside independent service. In a preferred embodiment the invention program rating information is obtained in digital electronic form from a commercial program data base service. Program coded labels may pre-exist or be incorporated in the database by the cable systems or other entity.

The invention employs a program label coding unit at the cable system headend to receive appropriately rated program information, for example, tagged with a database label, and to give that information channel address and timing codes, or clocking it, to be coordinated with the scheduled appearance of the relevant program. Conveniently, label coding can be effected using one or more fields of a database of forthcoming program schedule information. Program information thus tagged in digital form has to be distributed to the individual channels at the headend and incorporated with channel signals for output through channel modulators to viewers. A preferred means for imprinting digitized messages on selected channel signals is disclosed in the parent application Cowe U.S. patent application Ser. No. 08/120, 476 filed Sep. 13, 1993.

The invention of the parent patent application provides a channel messaging system that has the capability of encrypting a code in the channel signal in a variety of ways. One convenient location for a message is in the vertical interval of the video signal, which is typically a twenty line interval, between the bottom and top of the screen. One known use for the vertical interval is for close captioning. Plenty of space is available in the vertical interval, for short tagging or classification codes, or text messages, without interfering with existing services such as close captioning. The coding might for example merely comprise a small number, such as 1, 2, 3 ASCII characters, but preferably is a little more complex to permit more sophisticated program classification. Thus, the program coded label can have a first rating key of up to four ASCII characters classifying the program with a critical rating as to violence content, sexuality content, suitability for children, or the like, and a second content key independent from the rating key, of up to six ASCII characters, classifying or describing the program for content, in a way which could overlap the rating key, for example, as nature, science, history, 1950's movies and so on.

More sophisticated user functionality may employ a larger portion of the vertical interval could be used for still a more complex message.

One of the objectives to the invention is to ensure that the program label decoder unit employed at the viewing station is an economical unit. Thus its processing functions should be minimized. To this end a particularly economical embodiment of the invention encodes the program rating coded label as an audio tone in a gap in the video signal, for example, in the gap between the luminance band and the chrominance band or between the chrominance band and the ???. This code can easily be detected by an oscillator in the program label decoder, and used to activate desired messaging or blackout systems.

A channel messaging system in accordance with the invention disclosed in the parent application, can be used to override the relevant channel at times chosen in relationship to the scheduled viewing time of any particular program-relevant alert messages regarding the content of that program, based upon the program coded label information output by the program code unit.

The program code unit can provide an input to a channel message server unit which input is effective repeatedly to trigger output of a channel message stored at the server to the appropriate channel for a given program. This process can readily be replicated many times to coded label a large number of programs on different channels.

A more sophisticated context-sensitive program code could classify programs according to subject matter, for example as suitable for young children, as nature material, as scientific material, sports, subclassifications of sports such as football or basketball, cooking and so on and so forth. This program information could then be read at the subscriber end by any desired means for example by a streamed output on a separate channel, or possibly by a cycled output on a separate channel, which would decode that information and then according to the viewers expressed selections of program subject matter category could print a report of upcoming programs of interest or activate an alert of interest. A more sophisticated system requiring significant viewing station equipment would automatically activate channel selection and program display at the appropriate time according to the schedule to give the viewer an automatic presentation of subject matter of interest. An audible alert can be sounded if desired, activated by the program coded label, to indicate, or anticipate program commencement or the program, or program suite can be automatically stored to tape or other medium on a video recorder.

Less sophisticated versions of the program label decoder can also inexpensively incorporate a contact closure to serve useful functions such for example as activating an alarm to warn off emergencies. The alarm might be audible or might be a contact vibration device, or bed jiggler or the like.

Figure 17:
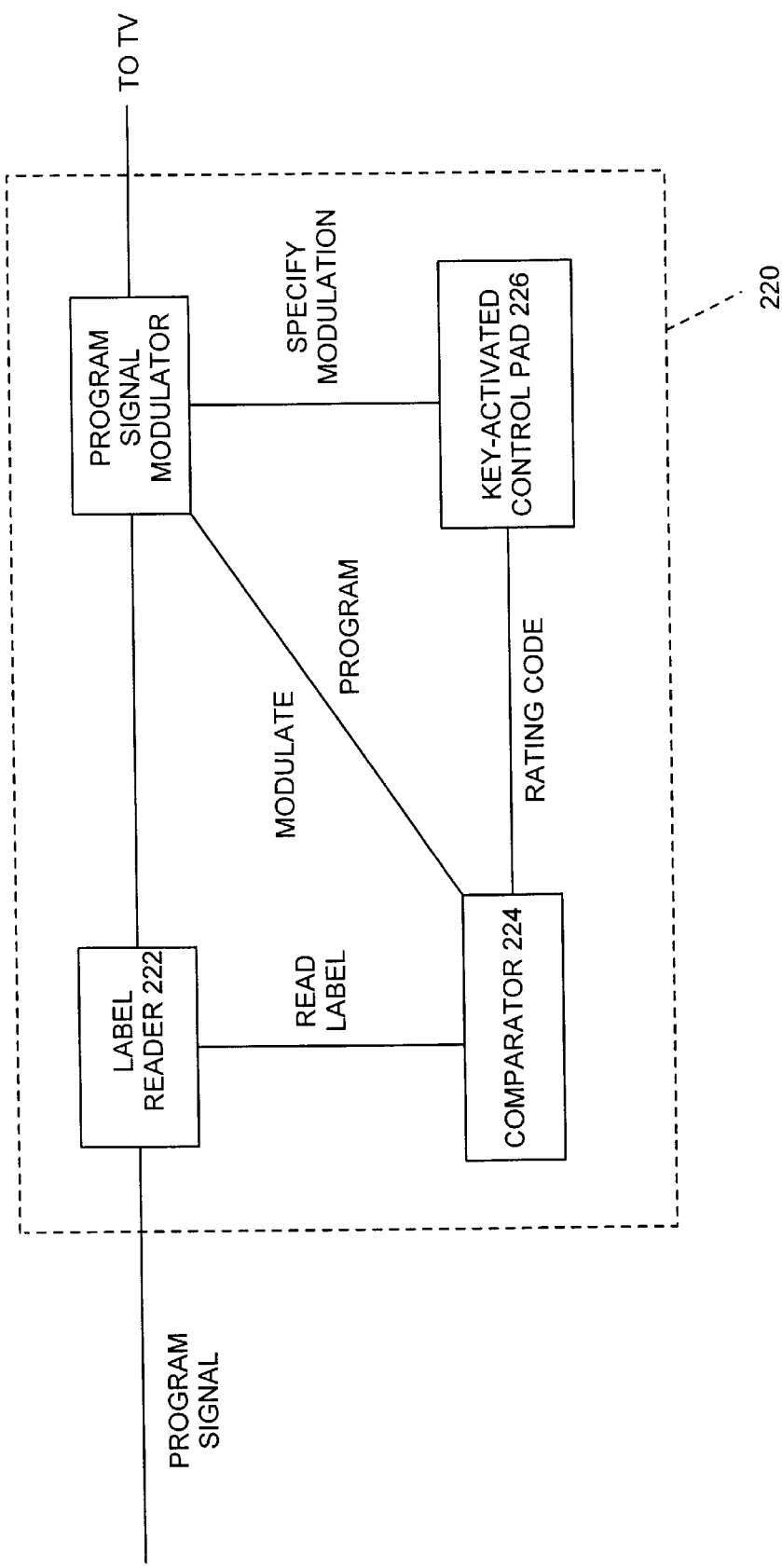
FIG. 17 is a schematic of a subscriber module usable to decode program coding labels inserted at the headend with the messaging system of the invention.
Figure 18:
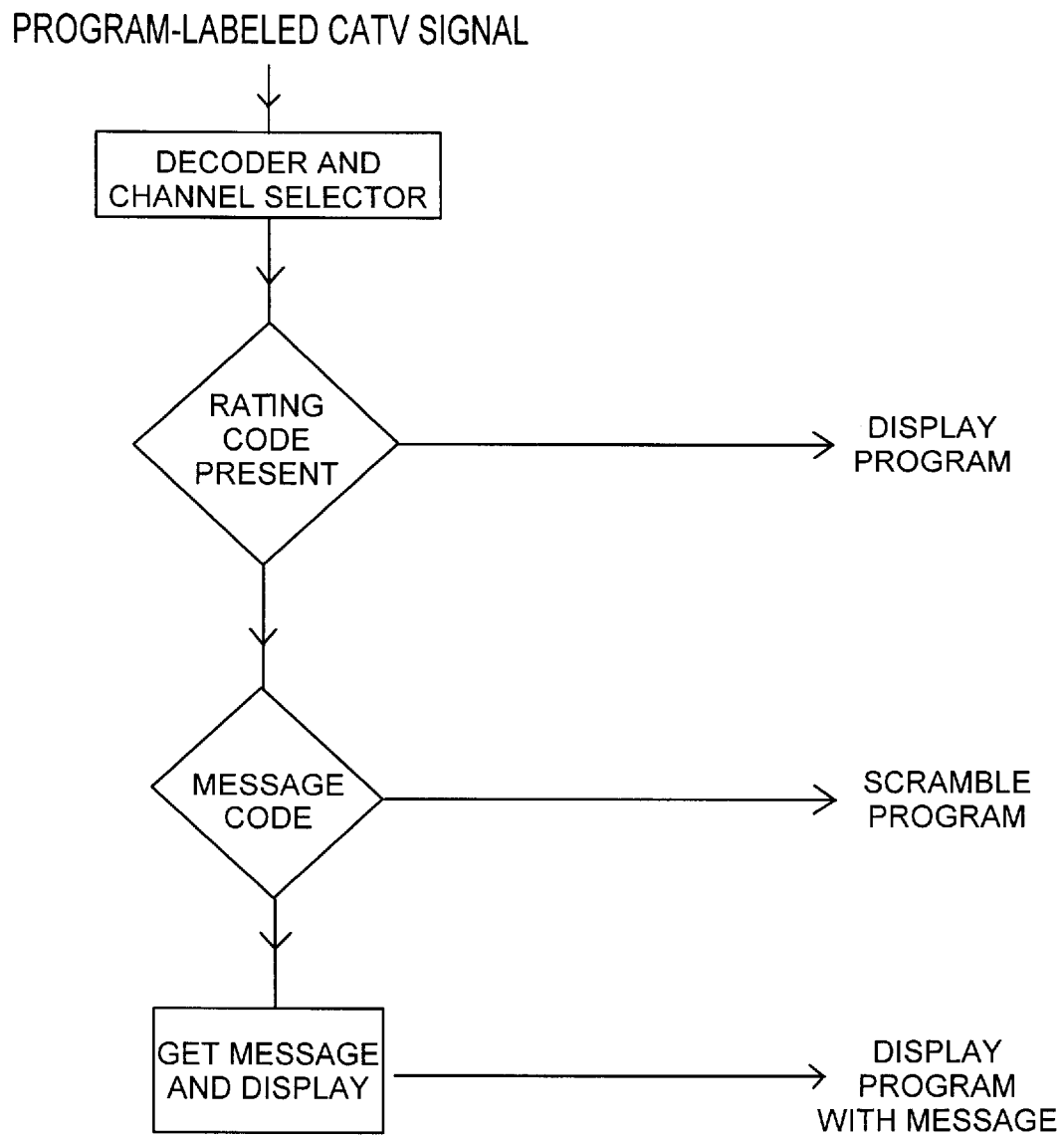
FIG. 18 is a schematic flow diagram of such a subscriber box.

As shown in FIG. 17, a subscriber decoder module 220 intended for use by subscribers to a cable television network equipped with a messaging system as described hereinabove, can be coaxially cabled in series between a cable system decoder box, if utilized, and the televsion monitor or could be incorporated in a digital set top unit, an incoming program signal is read by label reader 222 which passes the signal directly to the television monitor if no label is detected. If label reader 222 detects a coded label in the vertical blanking interval of the incoming channelized program signal, label is passed to a comparator 224 where it is compared with a subscriber-selected rating code supplied to the comparator 224 from a key-activated control pad 226 (which can be operable by a remote) which the subscriber uses to select a rating level to exclude, message, scramble, or otherwise modulate. As well as selecting a particular program rating or rating level to which to respond, the subscriber can choose the nature of the response, or the program modulation mode, i..e message, scramble, blackout, etc. If the comparator determines the read label should be acted upon it notifies program signal modulator 228 which applies a modulation mode to the program signa l according to what the subsrciber has selected with control pad 226. An additional program modulation mode could be the addition of a screen saver, similar to a computer screen saver, a rural scene, goldfish, or other moving pattern to channels scrambled by the cable system using an onboard graphics generator or graphics supplied by the headend messaging system in the vertical blanking interval of the scrambled channel. The flow diagram of FIG. 18 shows a slightly modified process flow for a subscriber module pursuant to this aspect of the invention.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. A multi-channel audio messaging system for cable television for enabling multiple different input audio messages to be supplied to multiple different channels of a cable television system, the cable television system having a headend where multiple external program signals are channelized by means of individual channel modulators having program signal input ports and are exported to a cable network for transmission to a subscriber audience, said audio messaging system being installable at a cable television headend and comprising:

multiple analog audio input message sources multiplexed by an analog audio multiplexer to provide a multiplexed audio input, digital conversion means to digitize the multiplexed audio input and output digitized audio signals, means to switch and control the digitized audio signals and decoder means to read and select from the digitized audio signals to provide different audio messages on desired channels.

2. A multi-channel audio messaging system according to claim 1 wherein the analog audio multiplexer, the digital conversion means the switch and control means and the decoder means are embodied as an integral module.

3. A multi-channel audio messaging system according to claim 2 further comprising a microprocessor and a network connection embodied in said integral module.

4. A multi-channel audio messaging system according to claim 3 further comprising random access memory to receive digitized audio signals and non-volatile storage to receive selected ones of said digitized audio signals from random access memory said decoder means being controllable to decode audio messages selectively from the random access memory or the non-volatile storage, said random access memory and said non-volatile storage being embodied in said integral module.

5. A multi-channel audio messaging system according to claim 4 comprising a pulse code modulator to output audio messages to a telephone network.

6. A multi-channel audio messaging system according to claim 1 with capacity for at least eight audio input and eight audio output channels.

* * * * *